US006774385B2

(12) United States Patent
Imai

(10) Patent No.: US 6,774,385 B2
(45) Date of Patent: Aug. 10, 2004

(54) IMAGE RECORDING MEDIUM AND METHOD OF MANUFACTURING THE SAME

(75) Inventor: Shinji Imai, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 392 days.

(21) Appl. No.: 09/813,883

(22) Filed: Mar. 22, 2001

(65) Prior Publication Data

US 2001/0025933 A1 Oct. 4, 2001

(30) Foreign Application Priority Data

Mar. 22, 2000 (JP) .................................... 2000-080486
Mar. 22, 2002 (JP) .................................... 2000-080485

(51) Int. Cl.[7] ............................................ G01T 1/16
(52) U.S. Cl. ................................ 250/580; 250/591
(58) Field of Search ........................ 250/580, 208.1, 250/370.08, 370.09, 591; 378/28, 31, 32; 427/160; 430/83, 85, 86, 95

(56) References Cited

U.S. PATENT DOCUMENTS 4,176,275 A 11/1979 Korn et al. ................. 250/213
4,535,468 A 8/1985 Kempter ...................... 378/31
4,842,973 A * 6/1989 Badesha et al. ............ 430/128
4,961,209 A 10/1990 Rowlands et al. ............ 378/29
5,268,569 A 12/1993 Nelson et al. .............. 250/214
5,354,982 A 10/1994 Nelson et al. .............. 250/214
5,925,890 A 7/1999 Van den Bogaert et al. 250/580
6,171,643 B1 * 1/2001 Polischuk et al. ............ 427/76
6,268,614 B1 * 7/2001 Imai ........................... 250/591
6,552,356 B2 * 4/2003 Imai ........................... 250/580

FOREIGN PATENT DOCUMENTS

EP 0 422 238 A1 4/1991
EP 0 898 421 A2 2/1999 ............ H04N/5/30
JP 9-5906 1/1997 ........... G03B/42/02

OTHER PUBLICATIONS

Anonymous; "Method and device for reocrding and transducing an electromagnetic energy pattern", Research Disclosure, pp. 229–231.*

Rowlands et al; "X–ray imaging using amorphous selenium: Photoinduced discharge (PID) readout for digital general radiography", Medical Physics, vol. 22, No. 12, pp 1983–1986.*

* cited by examiner

*Primary Examiner*—Jay Patidar
(74) *Attorney, Agent, or Firm*—Sughrue Mion, PLLC

(57) ABSTRACT

An image recording medium includes a support and a first electrode layer, a reading photoconductive layer which exhibits conductivity upon exposure to a reading electromagnetic wave, a charge accumulating portion which accumulates an electric charge of a latent image polarity generated in a recording photoconductive layer, the recording photoconductive layer which exhibits conductivity upon exposure to a recording electromagnetic wave and a second electrode layer which are superposed on the support one on another in this order. At least one of the recording photoconductive layer and the reading photoconductive layer is formed of a material containing a-Se as a major component and doped with a material for suppressing bulk crystallization of a-Se.

26 Claims, 13 Drawing Sheets

IMAGE RECORDING MEDIUM AND METHOD OF MANUFACTURING THE SAME

BACKGROUND OF THE INVENTION

1. Field of the Invention

This invention relates to an image recording medium on which an image can be recorded as a latent image and a method of manufacturing the image recording medium.

2. Description of the Related Art

In order to reduce irradiation dose to the patients and/or to improve diagnostic performance of the X-ray image in a medical radiography, there have been proposed various systems in which a photoconductive body sensitive to X-rays is used as an image recording medium, and an electrostatic latent image formed on the photoconductive body upon exposure to X-rays is read out. For example, see U.S. Pat. Nos. 4,176,275, 5,268,569, 5,354,982, and 4,535,468, "23027 Method and Device for recording and transducing an electromagnetic energy pattern"; Research Disclosure Jun. 1983, Japanese Unexamined Patent Publication No. 9(1997)-5906, U.S. Pat. No. 4,961,209, and "X-ray imaging using amorphous selenium"; Med Phys. 22(12).

For example, the image recording medium disclosed in U.S. Pat. No. 4,535,468 comprises a conductive substrate (which functions as a recording light side electrode layer) which is formed of, for instance, a relatively thick (e.g., 2 mm) aluminum plate and is permeable to recording light (an electromagnetic wave), and a recording photoconductive layer which is formed of a photoconductive material containing a-Se (amorphous selenium) as a major component and is 100 to 500 μm in thickness, an intermediate layer (trapping layer) 0.01 to 10.0 μm thick which is formed of, for instance, $AsS_4$, $As_2S_3$ and/or $As_2Se_3$ and in which an electric charge of a polarity of latent image generated in the recording photoconductive layer gets trapped and accumulates, a reading photoconductive layer which is formed of a photoconductive material containing a-Se as a major component and is 5 to 100 μm in thickness and a reading light side electrode layer which is formed of, for instance, Au or ITO (indium tin oxide) 100 nm thick and is permeable to reading light (an electromagnetic wave) which are formed on the conductive substrate in this order. There are further disclosed that it is preferred that the reading light side electrode layer be used as the positive electrode layer from the viewpoint of better use of mobility of positive holes and that deterioration in S/N ratio due to direct injection of an electric charge from the electrode layer can be prevented by providing a blocking layer of organic material between the reading light side electrode layer and the reading photoconductive layer. That is, the recording medium is a multilayered recording medium which is formed of a plurality of layers of photoconductive material containing a-Se as a major component and is high in dark resistance and response speed to reading.

In order to increase the S/N ratio and to effect reading simultaneously at a plurality of places (normally arranged in the main scanning direction) to shorten the reading time, the reading light side electrode is sometimes shaped into a stripe electrode comprising a plurality of line electrodes arranged at intervals equal to the pixel pitch. See, for instance, Japanese Unexamined Patent Publication No. 10(1998)-232824. However it is difficult to form a stripe electrode layer on the reading photoconductive layer of the recording medium disclosed in the aforesaid U.S. Pat. No. 4,535,468. This is because the stripe electrode layer is formed by photo-etching a solid electrode layer and a-Se in the reading photoconductive layer deteriorates in its properties under a high temperature (e.g., 200° C.) to which the reading photoconductive layer is subjected during, for instance, baking photoresist.

Further, alkali developer used for developing the photoresist emits harmful gas when brought into contact with the photoresist, and removal of the harmful gas complicates the manufacturing procedure and adds to the cost.

This applicant has proposed, in Japanese Unexamined Patent Publication No. 10(1998)-232824, an image recording medium (an electrostatic recording medium) comprising a recording light side electrode layer which is formed of $SnO_2$ (nesa film) and is permeable to recording light (radiation), a recording photoconductive layer which is formed of a photoconductive material containing a-Se as a major component and is 50 to 1000 μm in thickness, a charge transfer layer which is formed of, for instance, a-Se doped with 10 to 200 ppm of organic material or Cl and forms a charge accumulating portion for accumulating an electric charge of a polarity of latent image generated in the recording photoconductive layer on an interface between the recording photoconductive layer and the charge transfer layer, a reading photoconductive layer which is formed of a photoconductive material containing a-Se as a major component and a reading light side electrode layer which is permeable to reading light which are superposed one on another in this order.

In the specification of Japanese Unexamined Patent Publication No. 10(1998)-232824, there is no clear disclosure as for from which side the layers are formed, that is, whether the recording light side electrode layer is formed first and the reading light side electrode layer is formed last, or the reading light side electrode layer is formed first and the recording light side electrode layer is formed last. This means that the layers may be formed in whichever order. However, in the specification, there is proposed to use a conductive material layer such as a nesa film formed on a transparent glass plate (support) as the reading light side electrode layer and to use the reading light side electrode layer as the positive electrode layer. There is further proposed to form the reading light side electrode layer, by use of the semiconductor forming technique, as a stripe electrode layer or a comb electrode layer comprising a plurality of comb teeth electrodes arranged at intervals equal to the pixel pitch. In this case, the stripe electrode layer is first formed on a transparent glass substrate by photo-etching or the like and then the reading photoconductive layer to the recording light side electrode layer are formed on the reading light side electrode layer. Though not clearly shown in the specification, it is easy for a person with ordinary skill in the art to come up with the idea of setting the pixel pitch to 50 to 200 μm since it is important in the medical radiography to obtain a high S/N ratio with a high sharpness.

As in the aforesaid U.S. Pat. No. 4,535,468, we have proposed in the aforesaid Japanese Unexamined Patent Publication No. 10(1998)-232824 to prevent deterioration in S/N ratio due to direct injection of a positive electric charge on the reading light side electrode layer by providing a blocking layer about 500 Å thick of inorganic material such as $CeO_2$ between the reading light side electrode layer and the reading photoconductive layer.

We have further studied the image recording medium proposed in our Japanese Unexamined Patent Publication No. 10(1998)-232824 and have found the following points.

1) A method of forming the stripe electrode layer in which a relatively thin (e.g., 50 to 200 nm) ITO film is first formed on a transparent glass substrate and the ITO film is shaped into a stripe electrode layer by photo-etching is suitable for forming a fine stripe pattern at low cost.

2) By forming the recording photoconductive layer of an a-Se layer 50 to 1000 μm thick, a higher dark resistance is obtained.

3) As the charge transfer layer, a laminated positive hole transfer layer, formed by a first positive hole transfer layer 0.1 to 1 μm thick which is of organic material and accumulates electrons to form a charge accumulating portion and a second positive hole transfer layer 5 to 30 μm thick which is formed of a-Se doped with 10 to 200 ppm of Cl, transfers positive holes at high speed and is less in positive hole traps, is advantageous from the viewpoint of afterimage and response speed to reading.

4) To form the reading photoconductive layer of an a-Se layer 0.05 to 0.5 μm thick is advantageous in obtaining a high dark resistance.

5) When the charge transfer layer is in the form of a laminated positive hole transfer layer comprising a first charge transfer layer 0.1 to 1 μm thick which is of PVK, TPD or the like and a second charge transfer layer 5 to 30 μm thick which is formed of a-Se doped with 10 to 200 ppm of Cl, the first charge transfer layer comes to exhibit high resistance to the electric charge of the latent image polarity (the polarity of latent image) while the second charge transfer layer comes to transfer the electric charge of the transfer polarity (the electric charge of the polarity to be transferred) at high speed, which is advantageous from the viewpoint of afterimage and response speed to reading. However, when the second charge transfer layer is replaced by an a-Se layer 5 to 30 μm thick and the a-Se layer is caused to double the second charge transfer layer and the reading photoconductive layer, a relatively excellent image recording medium can be manufactured with the manufacturing procedure simplified.

That is, the image recording medium proposed in our Japanese Unexamined Patent Publication No. 10(1998)-232824 is an excellent multi-layered recording medium which is high in dark resistance and response speed to reading, and is preferably formed of a plurality of layers of photoconductive material containing a-Se as a major component.

As is well known, in an a-Se film, crystallization progresses with time, which can give rise to a so-called bulk crystallization problem that especially the dark resistance deteriorates. The bulk crystallization significantly occurs when the a-Se film is of non-doped or pure a-Se and progresses at higher speed as the temperature is higher. Accordingly, the aforesaid image recording medium which comprises many layers of non-doped a-Se is severely limited in working temperature and service life.

Further, it has been well known that interfacial crystallization progresses on an interface between an a-Se film and another material during the step of depositing films. For example, when the recording light side electrode layer is deposited on the recoding photoconductive layer, the interfacial crystallization is apt to progress on the interface between the recording photoconductive layer and the recording light side electrode layer, which causes an electric charge to be directly injected into the recording photoconductive layer from the recording light side electrode layer during recording (where a high electric voltage is applied), which deteriorates the S/N ratio. When the electrode layer is of a transparent oxide film, especially an ITO film, the interfacial crystallization markedly progresses and deterioration in S/N ratio is significant.

In the image recording medium described above, a latent image is recorded by accumulating in the charge accumulating portion the electric charge of the latent image polarity generated in the recording photoconductive layer upon exposure to a recording electromagnetic wave passing through an object, and reading is carried out by coupling of charged pairs, generated in the reading photoconductive layer upon exposure to a reading electromagnetic wave passing through the reading light side electrode layer, with the electric charge of the latent image polarity in the charge accumulating portion.

The charged pair generating efficiency of the recording photoconductive layer is proportional to the strength of the electric field formed between the charge accumulating portion and the reading light side electrode layer. When the amount of the recording electromagnetic wave is reduced in order to reduce irradiation dose to the patients, the charge of the latent image polarity accumulated in the charge accumulating portion is reduced and the electric field formed between the charge accumulating portion and the reading light side electrode layer becomes weak, which results in poor charged pair generating efficiency and deterioration in sensitivity of the image recording medium to the reading light. Increase of the amount of reading light in order to compensate for deterioration in sensitivity of the image recording medium to the reading light gives rise to a problem of increase in the cost or the like.

SUMMARY OF THE INVENTION

In view of the foregoing observations and description, the primary object of the present invention is to provide an image recording medium provided with a photoconductive layer containing therein a-Se as a major component which is free from the problem of bulk crystallization and accordingly is relatively free from the limitation in working temperature and service life.

Another object of the present invention is to provide an image recording medium in which interfacial crystallization due to deposition of the recording light side electrode layer onto the recording photoconductive layer can be suppressed, thereby suppressing the problem of deterioration of the S/N ratio.

Still another object of the present invention is to provide an image recording medium which is high in sensitivity to the reading light.

Still another object of the present invention is to provide a method of manufacturing such an image recording medium.

In accordance with a first aspect of the present invention, there is provided an image recording medium comprising a support permeable to a reading electromagnetic wave and a first electrode layer (a reading light side electrode layer) permeable to the reading electromagnetic wave, a reading photoconductive layer which exhibits conductivity upon exposure to the reading electromagnetic wave, a charge accumulating portion which accumulates an electric charge of a latent image polarity generated in a recording photoconductive layer, the recording photoconductive layer which exhibits conductivity upon exposure to a recording electromagnetic wave and a second electrode layer (a recording light side electrode layer) permeable to the recording electromagnetic wave which are superposed on the support one on another in this order, at least one of the recording photoconductive layer and the reading photoconductive layer being formed of a material containing a-Se as a major component and doped with a material for suppressing bulk crystallization of a-Se.

When both the recording photoconductive layer and the reading photoconductive layer are formed of a material containing a-Se as a major component, it is preferred that both the recording photoconductive layer and the reading photoconductive layer be doped with a material for suppressing bulk crystallization of a-Se.

It is preferred in view of high dark resistance that the recording photoconductive layer be about 50 to 1000 μm in thickness and the reading photoconductive layer be about 0.05 to 0.5 μm in thickness. When the charge accumulating portion is formed by providing a charge transfer layer between the recording photoconductive layer and the reading photoconductive layer, the charge transfer layer may be in the form of a layer of PVK or TPD 0.1 to 1 μm thick and the reading photoconductive layer may be a layer of a-Se 5 to 30 μm thick.

As the material for suppressing bulk crystallization of a-Se, for instance, As (arsenic) is preferred and the doping amount of As is preferably 0.1 to 0.5 atom % and more preferably 0.33 atom %. Doping a-Se with a large amount of As is attended by adverse effect that positive hole traps are increased and the photoconductive layer deteriorates in its inherent function, especially carrier mobility. Accordingly, the doping amount of As should be limited within such a range that the inherent function of the photoconductive layer is not greatly deteriorated.

In order to prevent the adverse effect of doping a-Se with As, it is preferred that the photoconductive layer doped with As be further doped with, for instance, Cl (chlorine), and the doping amount of Cl is preferably 10 to 50 ppm (on the atomic base, the same in the following). More preferably, the doping amount of As is 0.33 atom % and the doping amount of Cl is 30 to 40 ppm.

The image recording medium in accordance with the first aspect of the present invention may be provided with one or more other layers interposed between the aforesaid layers so long as the aforesaid layers are superposed in the aforesaid order.

In accordance with a second aspect of the present invention, there is provided an image recording medium comprising a support permeable to a reading electromagnetic wave and a first electrode layer (a reading light side electrode layer) permeable to the reading electromagnetic wave, a reading photoconductive layer which exhibits conductivity upon exposure to the reading electromagnetic wave, a charge transfer layer which behaves like a substantially insulating material to an electric charge of a latent image polarity generated in a recording photoconductive layer and behaves like a substantially conductive material to the electric charge of the polarity opposite to the latent image polarity, the recording photoconductive layer which exhibits conductivity upon exposure to a recording electromagnetic wave and a second electrode layer (a recording light side electrode layer) permeable to the recording electromagnetic wave which are superposed on the support one on another in this order, the charge transfer layer being formed of a material containing a-Se as a major component and doped with a material for suppressing bulk crystallization of a-Se.

It is preferred that provision be made not to rob the charge transfer layer of its function by said doping. For example, the charge transfer layer is preferably formed of a material containing therein a-Se as a major component and doped with As in 0.1 to 0.5 atom % and Cl in 20 to 250 ppm.

When based on a charge transfer layer formed of a material containing a-Se as a major component and doped with 10 to 200 ppm of Cl, positive hole traps are increased and the function of the charge transfer layer is deteriorated or lost by simply doping the charge transfer layer with As. Accordingly, in order to prevent the adverse effect of doping a-Se with As, the doping amount of As is limited to 0.1 to 0.5 atom % and the doping amount of Cl is limited to 20 to 250 ppm.

The image recording medium in accordance with the second aspect of the present invention may be provided with one or more other layers interposed between the aforesaid layers so long as the aforesaid layers are superposed in the aforesaid order.

In the image recording medium of the second aspect, based on a charge transfer layer formed of a material containing a-Se as a major component and doped with 10 to 200 ppm of Cl, it is preferred that the doping amount of As be 0.33 atom % and the doping amount of Cl be 30 to 40 ppm.

Further, in the image recording medium in accordance with the first or second aspect of the present invention, the thickness of the recording photoconductive layer is preferably 400 to 1000 μm and more preferably 700 to 1000 μm.

In accordance with a third aspect of the present invention, there is provided a method of manufacturing an image recording medium comprising a support permeable to a reading electromagnetic wave and a first electrode layer permeable to the reading electromagnetic wave, a reading photoconductive layer which exhibits conductivity upon exposure to the reading electromagnetic wave, a charge accumulating portion which accumulates an electric charge of a latent image polarity generated in a recording photoconductive layer, the recording photoconductive layer which exhibits conductivity upon exposure to a recording electromagnetic wave and a second electrode layer permeable to the recording electromagnetic wave which are superposed on the support one on another in this order, the method characterized in that the recording photoconductive layer is formed in a thickness of 200 to 1000 μmm by resistance heating deposition of an alloy material containing therein Se as a major component and doped with 0.1 to 0.5 atom % of As and 10 to 50 ppm of Cl.

In accordance with a fourth aspect of the present invention, there is provided a method of manufacturing an image recording medium comprising a support permeable to a reading electromagnetic wave and a first electrode layer permeable to the reading electromagnetic wave, a reading photoconductive layer which exhibits conductivity upon exposure to the reading electromagnetic wave, a charge transfer layer which behaves like a substantially insulating material to an electric charge of a latent image polarity generated in a recording photoconductive layer and behaves like a substantially conductive material to the electric charge of the polarity opposite to the latent image polarity, the recording photoconductive layer which exhibits conductivity upon exposure to a recording electromagnetic wave and a second electrode layer permeable to the recording electromagnetic wave which are superposed on the support one on another in this order, the method characterized in that the recording photoconductive layer is formed in a thickness of 200 to 1000 μm by resistance heating deposition of an alloy material containing therein Se as a major component and doped with 0.1 to 0.5 atom % of As and 10 to 50 ppm of Cl.

The reason why the recording photoconductive layer is formed by resistance heating deposition of an alloy material containing therein Se as a major component and doped with 0.1 to 0.5 atom % of As and 10 to 50 ppm of Cl is to make higher the As concentration at the extreme surface of the recording photoconductive layer facing the interface between the second electrode layer (the recording light side electrode layer) and the recording photoconductive layer than that inside the bulk by use of effect of fractional distillation during the resistance heating deposition. In order to obtain such an effect of fractional distillation, the resistance heating deposition in which deposition can be effected at a relatively low temperature is more suitable as compared with other deposition methods such as electron beam deposition, sputtering, and the like.

The recording photoconductive layer may be formed in a thickness of 400 to 1000 μm or 700 to 1000 μm.

In accordance with the first aspect of the present invention, since the recording photoconductive layer and/or the reading photoconductive layer is formed of a material containing a-Se as a major component, the image recording medium can be high in dark resistance, which results in a high S/N ratio. However, when the photoconductive layer is formed of pure a-Se material, the aforesaid problem bulk crystallization occurs. The material for suppressing bulk crystallization of a-Se slows down progress of bulk crystallization and the limitation in working temperature and service life can be relaxed.

Accordingly, the image recording medium in accordance with the first aspect of the present invention can be high in S/N ratio, can withstand a relatively high temperature and is long in service life.

Doping a-Se with a material for suppressing bulk crystallization of a-Se, e.g., As, is attended by adverse effect on inherent function of the photoconductive layer as described above. However the adverse effect can be compensated for by doping with, for instance, Cl together with the material for suppressing bulk crystallization of a-Se, e.g., As.

In accordance with the second aspect of the present invention, since the charge transfer layer is formed of a material containing a-Se as a major component and doped with a material for suppressing bulk crystallization of a-Se, progress of bulk crystallization is slowed down. Accordingly, the image recording medium in accordance with the second aspect of the present invention can withstand a relatively high temperature and is long in service life.

For example, when based on a charge transfer layer formed of a material containing a-Se as a major component and doped with 10 to 200 ppm of Cl, the charge transfer layer is doped with a predetermined amount of As and a predetermined amount of Cl, progress of bulk crystallization can be slowed down without deteriorating the function of the charge transfer layer.

In accordance with the methods of the third and fourth aspects of the present invention, since the recording photoconductive layer is formed by resistance heating deposition of an alloy material containing therein Se as a major component and doped with 0.1 to 0.5 atom % of As and 10 to 50 ppm of Cl, the As concentration at the extreme surface of the recording photoconductive layer facing the interface between the second electrode layer and the recording photoconductive layer is made higher than that inside the bulk as a result of fractional distillation of As and Cl during the resistance heating deposition. As a result, interfacial crystallization due to deposition of the second electrode layer onto the recording photoconductive layer is prevented, and deterioration in S/N ratio due to direct injection of an electric charge from the electrode caused by the interfacial crystallization can be prevented. Further, in accordance with our experiment, use of an alloy material containing Se as a major component and doped with 0.35 atom % of As and 20 ppm of Cl resulted in better interfacial crystallization prevention than use of an alloy material containing Se as a major component and doped with 1.0 atom % of As. This result means interfacial crystallization prevention by increasing the As concentration can be enhanced by using an alloy material doped with Cl in addition to As.

Further, when the recording photoconductive layer is large in thickness (200 to 1000 μm, preferably 400 to 1000 μm and more preferably 700 to 1000 μm), the resistance heating deposition is carried out taking a long time at a relatively low temperature and the As concentration at the extreme surface of the recording photoconductive layer is more increased by fractional distillation, whereby the interfacial crystallization prevention effect can be enhanced.

In accordance with a fifth aspect of the present invention, there is provided an image recording medium comprising a support permeable to a reading electromagnetic wave and a first electrode layer (a reading light side electrode layer) permeable to the reading electromagnetic wave (may be of a transparent oxide film such as ITO), a reading photoconductive layer which is formed of a material containing a-Se as a major component and exhibits conductivity upon exposure to the reading electromagnetic wave, a charge accumulating portion which accumulates an electric charge of a latent image polarity generated in a recording photoconductive layer, the recording photoconductive layer which exhibits its conductivity upon exposure to a recording electromagnetic wave and a second electrode layer (a recording light side electrode layer) permeable to the recording electromagnetic wave which are superposed on the support one on another in this order, wherein between the first electrode layer and the reading photoconductive layer is provided an interfacial crystallization suppressing layer which is permeable to the reading electromagnetic wave and suppresses interfacial crystallization of a-Se.

It is preferred that the interfacial crystallization suppressing layer has, in addition to the function of suppressing interfacial crystallization, functions of blocking an electric charge from being directly injected from the first electrode layer, relieving thermal stress caused by the difference in thermal expansion coefficient between the first electrode and the reading photoconductive layer and firmly bonding the first electrode layer and the reading photoconductive layer in close contact with each other.

In the case where the first electrode layer is in the form of a stripe electrode comprising a plurality of line electrodes arranged in a direction perpendicular to the longitudinal direction of each line electrode, it is preferred that the interfacial crystallization suppressing layer be provided continuously along the upper surface (the surface facing the reading photoconductive layer) and the longitudinal side surfaces of each of the line electrodes.

In order to suppress interfacial crystallization, the interfacial crystallization suppressing layer need not be provided between the line electrodes. However, the interfacial crystallization suppressing layer may be provided also on the upper surface of the substrate between the line electrodes for the purpose of simplicity of manufacture. That is, the portion of the interfacial crystallization suppressing layer formed between the line electrodes during formation of the interfacial crystallization suppressing layer along the upper surface and the side surfaces of each line electrode need not be removed.

It is preferred that the interfacial crystallization suppressing layer be formed of a material which is transparent and elastic and is excellent in function of blocking an electric charge from being directly injected from the first electrode layer. For example, it is preferred that the interfacial crystallization suppressing layer be formed of organic insulating polymer such as polyamide, polyimide, polyester, polyvinyl butyral, polyvinyl pyrrolidone, polyurethane, polymethyl methacrylate or polycarbonate, or an organic film material such as a mixture of an organic binder and a low-molecular organic material.

The interfacial crystallization suppressing layer may generally be in the range of 0.05 to 5 $\mu$m in thickness. The thickness of the interfacial crystallization suppressing layer is preferably in the range of 0.1 to 5 $\mu$m in order to relieve the thermal stress and in the range of 0.05 to 0.5 $\mu$m in order to obtain an excellent blocking function without after image. A good compromise therebetween is 0.1 to 0.5 $\mu$m.

The image recording medium in accordance with the fifth aspect of the present invention may be provided with one or more other layers such as charge transfer layer to be described later interposed between the aforesaid layers so long as the aforesaid layers are superposed in the aforesaid order.

In accordance with a sixth aspect of the present invention, there is provided an image recording medium comprising a support permeable to a reading electromagnetic wave and a first electrode layer (a reading light side electrode layer) permeable to the reading electromagnetic wave, a reading photoconductive layer which is formed of a material containing a-Se as a major component and exhibits conductivity upon exposure to the reading electromagnetic wave, a charge accumulating portion which accumulates an electric charge of a latent image polarity generated in a recording photoconductive layer, the recording photoconductive layer which exhibits conductivity upon exposure to a recording electromagnetic wave and a second electrode layer (a recording light side electrode layer) permeable to the recording electromagnetic wave which are superposed on the support one on another in this order, wherein the reading photoconductive layer is doped over the whole or in the surface area facing the first electrode layer with an interfacial crystallization suppressing material which suppresses interfacial crystallization of a-Se.

When the reading photoconductive layer is doped with the interfacial crystallization suppressing material in the surface area, a thin film which suppresses interfacial crystallization of a-Se is formed nearest to the reading electromagnetic wave incident face.

As the interfacial crystallization suppressing material, for instance, As (arsenic) is preferred and the doping amount of As is preferably 0.5 to 40 atom %, and more preferably 5 to 40 atom %. When the doping amount of As is smaller than 0.5 atom %, interfacial crystallization preventing effect is not sufficient, whereas when the doping amount of As is larger than 40 atom %, crystallization other than crystallization of Se, such as $As_2Se_3$, becomes apt to occur.

When the thickness of the reading photoconductive layer is in the range of 0.05 to 0.5 $\mu$m, the response speed in reading is not greatly affected even if the reading photoconductive layer is doped with As in an amount of 0.5 to 40 atom % over the whole. When the thickness of the reading photoconductive layer exceeds the range, it is preferred that the reading photoconductive layer be doped with As in an amount of 0.5 to 40 atom % only in the surface area facing the first electrode layer.

Increase in the positive hole traps and/or the electron traps by doping with As elongates durability of optical fatigue of the interface caused by pre-exposure as will be described later and sometimes contributes to stabilization of offset noise.

In such a case, the amount of increase in the positive hole traps or the electron traps can be controlled by changing the doping amount of As. Up to about 5 atom %, the positive hole traps increases, as the As concentration further increases, the electron traps becomes prominent, and when the doping amount of As is about 40 atom %, the reading photoconductive layer exhibits properties like a-$As_2Se_3$, where the electron traps greatly increases and only the positive holes are movable with the electrons hardly movable. The doping amount As may be selected according to the material of the first electrode layer and/or the material of a blocking layer provided between the first electrode layer and the reading photoconductive layer.

Further, electron traps can be increased by doping with Cl in an amount of 1 to 1000 ppm in addition to As. Positive hole traps can be increased by doping with Na in an amount of 1 to 1000 ppm in place of As. The kind of doping material and/or the amount of the doping material may be selected according to the material of the first electrode layer and/or the material of a blocking layer provided between the first electrode layer and the reading photoconductive layer.

The image recording medium in accordance with the sixth aspect of the present invention may be provided with one or more other layers such as charge transfer layer to be described later interposed between the aforesaid layers so long as the aforesaid layers are superposed in the aforesaid order.

In accordance with a seventh aspect of the present invention, there is provided a method of manufacturing an image recording medium which is provided with an interfacial crystallization suppressing layer and a first electrode layer in the form of a stripe electrode comprising a plurality of line electrodes. The method of the seventh aspect is characterized in that the interfacial crystallization suppressing layer is formed by applying an interfacial crystallization suppressing material in the longitudinal direction of the line electrodes.

The interfacial crystallization suppressing layer may be applied after forming the stripe electrode on a support of glass, organic polymer or the like by dipping, spraying, bar coating, screen coating or the like. Dipping is advantageous in that the interfacial crystallization suppressing layer can be formed by simply dipping the support bearing thereon the stripe electrode in solvent and taking it out from the solvent, and that a large size interfacial crystallization suppressing layer can be formed relatively easily.

In accordance with an eighth aspect of the present invention, there is provided an image recording medium comprising a support permeable to a reading electromagnetic wave and a first electrode layer permeable to the reading electromagnetic wave, a reading photoconductive layer which is formed of a material containing a-Se as a major component and exhibits conductivity upon exposure to the reading electromagnetic wave, a charge accumulating portion which accumulates an electric charge of a latent image polarity generated in a recording photoconductive layer, the recording photoconductive layer which exhibits conductivity upon exposure to a recording electromagnetic wave and a second electrode layer permeable to the recording electromagnetic wave which are superposed on the support one on another in this order, wherein an interfacial crystallization suppressing layer which is permeable to the reading electromagnetic wave, suppresses interfacial crystallization of a-Se, and has a function of blocking the electric charge at which the first conductive layer is electrified from being injected into the reading photoconductive layer is provided between the first electrode layer and the reading photoconductive layer, and the reading photoconductive layer is doped over the whole or in the surface area facing the interfacial crystallization suppressing layer with an interfacial crystallization suppressing material which suppresses interfacial crystallization of a-Se and a material which increases traps for a charge of the polarity opposite to that at which the first electrode layer is electrified and reduces traps for the charge of the same polarity as the polarity at which the first electrode layer is electrified.

The interfacial crystallization suppressing layer suppresses interfacial crystallization of a-Se and at the same time has a function of blocking the electric charge at which the first conductive layer is electrified from being injected into the reading photoconductive layer. That the interfacial crystallization suppressing layer has a function of blocking the electric charge at which the first conductive layer is electrified from being injected into the reading photoconductive layer means, for instance, that the layer prevents the electric charge from moving to a space-charge layer formed on the interface between the reading photoconductive layer and a blocking layer to be described later, thereby stabilizing the space-charge layer.

When the reading photoconductive layer is doped over the whole or in the surface area facing the interfacial crystallization suppressing layer with an interfacial crystallization suppressing material which suppresses interfacial crystallization of a-Se and a material which increases traps for a charge of the polarity opposite to that at which the first electrode layer is electrified and reduces traps for the charge of the same polarity as the polarity at which the first electrode layer is electrified, a negative space-charge layer is formed in the whole reading photoconductive layer or the surface area facing the interfacial crystallization suppressing layer in the case where the first electrode layer is positively electrified and the second electrode layer is negatively electrified, whereas, a positive space-charge layer is formed in the whole reading photoconductive layer or the surface area facing the interfacial crystallization suppressing layer in the case where the first electrode layer is negatively electrified and the second electrode layer is positively electrified.

The interfacial crystallization suppressing material may be As, and the doping amount of As is preferably 3 to 40 atom %.

When the first electrode layer is positively electrified, the material which increases traps for a charge of the polarity opposite to that at which the first electrode layer is electrified and reduces traps for the charge of the same polarity as the polarity at which the first electrode layer is electrified may be Cl and the doping amount of Cl is preferably 1 to 1000 ppm.

Whereas when the first electrode layer is negatively electrified, the material which increases traps for a charge of the polarity opposite to that at which the first electrode layer is electrified and reduces traps for the charge of the same polarity as the polarity at which the first electrode layer is electrified may be Na and the doping amount of Na is preferably 1 to 1000 ppm.

It is preferred that the thickness of the region doped with both the interfacial crystallization suppressing material and the material which increases traps for a charge of the polarity opposite to that at which the first electrode layer is electrified and reduces traps for the charge of the same polarity as the polarity at which the first electrode layer is electrified, that is, the region in which both the materials exist, be 0.01 to 0.1 μm.

It is preferred that the reading electromagnetic wave is 350 to 550 nm in wavelength.

The image recording medium in accordance with the eighth aspect of the present invention may be provided with one or more other layers such as charge transfer layer to be described later interposed between the aforesaid layers so long as the aforesaid layers are superposed in the aforesaid order.

In the image recording medium in accordance with the fifth aspect of the present invention, the interfacial crystallization suppressing layer provided between the first electrode layer and the reading photoconductive layer (may be of, for instance, an organic thin film) prevents a-Se from being in direct contact with material of the electrode such as ITO, whereby chemical change of Se is prevented and interfacial crystallization of Se is prevented. Accordingly, charge injection from the electrode due to interfacial crystallization cannot be increased and the problem of deterioration in S/N can be overcome.

Further, the interfacial crystallization suppressing layer may be provided with functions of blocking an electric charge from being directly injected from the first electrode layer, relieving thermal stress caused by the difference in thermal expansion coefficient between the first electrode and the reading photoconductive layer and firmly bonding the first electrode layer and the reading photoconductive layer in close contact with each other so that deterioration in S/N ratio can be prevented and structural failure such as breakage of the reading photoconductive layer and/or the support and/or peeling from each other due to thermal stress can be prevented.

In the case where the first electrode layer is in the form of a stripe electrode, when each of the line electrodes is covered with the interfacial crystallization suppressing layer continuously along the upper surface and the longitudinal side surfaces thereof, the reading photoconductive layer can be surely prevented from being in contact with the first electrode layer and interfacial crystallization of a-Se can be surely prevented.

Further, by simply applying an interfacial crystallization suppressing material, e.g., an organic polymer material, in the longitudinal direction of the line electrodes, the reading photoconductive layer can be surely kept away from the electrode.

In the image recording medium in accordance with the sixth aspect of the present invention, chemical change of Se at the interface between the reading photoconductive layer and the first electrode layer is prevented and interfacial crystallization of Se is prevented by the interfacial crystallization suppressing material in the reading photoconductive layer, whereby deterioration in S/N ratio due to local change of photoelectric properties of the reading photoconductive layer can be prevented. When the reading photoconductive layer is doped with the interfacial crystallization suppressing material in the surface area, a result substantially equivalent to that obtained when a thin film which suppresses interfacial crystallization of a-Se is formed nearest to the reading electromagnetic wave incident face can be obtained and interfacial crystallization of a-Se in the reading photoconductive layer can be more surely suppressed.

Positive hole traps or electron traps are generally increased at the interface by doping with As, which deteriorates the functions of the photoconductive layer. However, increase in the positive hole traps or the electron traps elongates durability of optical fatigue and sometimes contributes to stabilization of offset noise. The durability of optical fatigue can be adjusted by doping with Cl or Na in an amount of 1 to 1000 ppm in addition to As.

Further, in the image recording medium in accordance with the eighth aspect, a positive or negative space-charge layer is formed in the reading photoconductive layer, which increases the strength of the electric field and the charged pair generating efficiency, thereby increasing the sensitivity to the reading light.

When the reading photoconductive layer is doped with As in an amount of 3 to 40 atom %, the space-charge layer can be formed efficiently without deterioration in inherent functions of the photoconductive layer and the charged pair generating efficiency can be further increased.

When the first electrode layer is positively electrified, and As is employed as the material for suppressing interfacial crystallization of a-Se with 1 to 1000 ppm of Cl or Na used as the material which increases traps for a charge of the polarity opposite to that at which the first electrode layer is electrified and reduces traps for the charge of the same polarity as the polarity at which the first electrode layer is electrified, the positive or negative space-charge layer can be formed more efficiently without deterioration in inherent functions of the photoconductive layer and the charged pair generating efficiency can be further increased.

When the thickness of the region doped with both the interfacial crystallization suppressing material and the material which increases traps for a charge of the polarity opposite to that at which the first electrode layer is electrified and reduces traps for the charge of the same polarity as the polarity at which the first electrode layer is electrified is 0.01 to 0.1 $\mu$m, the thickness of the doped region becomes not larger than the depth of reading light absorption of the reading photoconductive layer and the charged pair generating efficiency can be further increased.

Further, when the reading electromagnetic wave is 350 to 550 nm in wavelength, the charged pair generating efficiency can be further increased.

DETAILED DESCRIPTION OF THE INVENTION

Figure 1A:
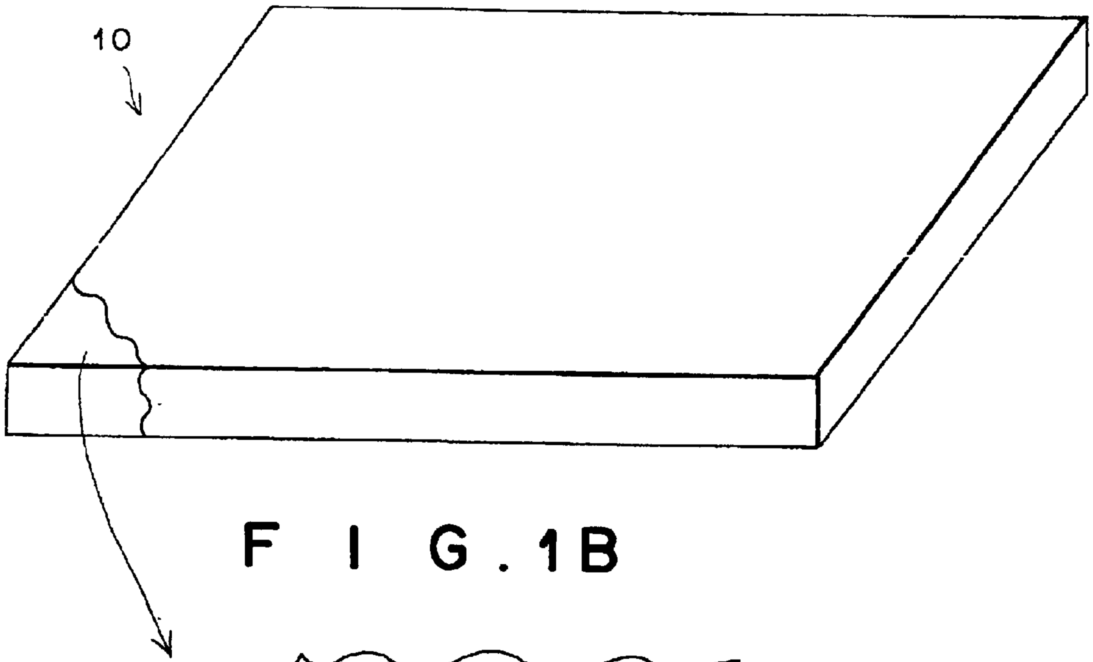
FIG. 1A is a perspective view of an image recording medium in accordance with a first embodiment of the present invention.
Figure 1B:
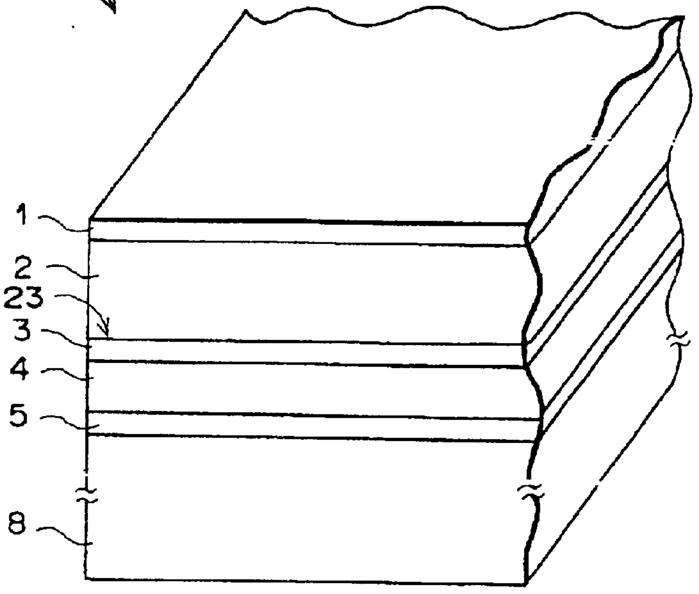
FIG. 1B is a cross-sectional view of a part of the image recording medium shown in FIG. 1A.

As shown in FIGS. 1A and 1B (especially in FIG. 1B), an image recording medium 10 in accordance with a first embodiment of the present invention comprises a support 8 permeable to reading light (e.g., blue region light not longer than 550 nm in wavelength), and a reading light side electrode layer 5 permeable to the reading electromagnetic light, a reading photoconductive layer 4 which exhibits conductivity upon exposure to the reading light, a charge transfer layer 3 which behaves like a substantially insulating material to an electric charge of a latent image polarity at which a recording light side electrode layer 1 is electrified and behaves like a substantially conductive material to the electric charge of the polarity opposite to the latent image polarity, the recording photoconductive layer 2 which exhibits conductivity upon exposure to recording light (e.g., a radiation such as X-rays) and a recording light side electrode layer 1 permeable to the recording light which are superposed on the support 8 one on another in this order. A charge accumulating portion 23 which accumulates an electric charge of the latent image polarity generated in the recording photoconductive layer 2 is formed at the interface between the recording photoconductive layer 2 and the charge transfer layer 3. In the following embodiments, it is assumed that the recording light side electrode layer is negatively electrified and the reading light side electrode is positively electrified so that a negative charge (a charge of the latent image polarity) is accumulated in the charge accumulating portion and the charge transfer layer is caused to function as a positive hole transfer layer in which the positive charge (the transfer polarity) is higher in mobility than the negative charge (the latent image polarity).

When manufacturing the image recording medium 10 of this embodiment, the reading light side electrode layer 5 is first formed on the support 8, and then the reading photoconductive layer 4, the charge transfer layer 3, the recording photoconductive layer 2 and the recording light side electrode layer 1 are superposed on the reading light side electrode layer 5 in this order.

The image recording medium 10 may be not smaller than 20×20 cm and, when to be used as a recording medium in chest radiography, may be 43×43 cm in effective size.

The support 8 should be of a material which is transparent to the reading light, is deformable with change in the environmental temperature and is in the range of a fraction to several times of the material of the reading photoconductive layer 4 in thermal expansion coefficient. Preferably the material of the support 8 is substantially the same as the material of the reading photoconductive layer 4. Since the reading photoconductive layer 4 is of a-Se, it is preferred that the support 8 is of a material whose thermal expansion coefficient is 1.0 to $10.0\times10^{-5}$/K. (40° C.) taking into account that the thermal expansion coefficient of Se is $3.68\times10^{-5}$/K. (40° C.). More preferably the support 8 is of a material whose thermal expansion coefficient is 1.2 to $5.2\times10^{-5}$/K. (40° C.) and most preferably 2.2 to $5.2\times10^{-5}$/K. (40° C.). For example, an organic polymer material may be used.

With this arrangement, the support 8 and the reading photoconductive layer (a-Se film) 4 can be matched with each other in thermal expansion so that failure due to the difference in thermal expansion coefficient, e.g., breakage of the reading photoconductive layer 4 and/or the support 8 and/or peeling from each other due to thermal stress, can be avoided even if the image recording medium 10 is subjected to a large temperature change cycle, for instance, during transportation by ship in a cold country. Further, the support of an organic polymer support is stronger against impact than a glass support.

The recording light side electrode layer 1 and the reading light side electrode layer 5 should be permeable respectively to the recording light and the reading light. For example, a nesa film ($SnO_2$), an ITO film (indium tin oxide) or an IDIOX film (Idemitsu Indium X-metal Oxide: amorphous transparent oxide film; IDEMITSU KOUSAN) in a thickness of 50 to 200 nm may be employed. When an X-ray is used as the recording light, the recording light side electrode layer 1 need not be transparent to visible light and accordingly, may be of, for instance, Al or Au in a thickness of 100 nm.

Each of the recording light side electrode 1 and the reading light side electrode 5 is a flat electrode in this particular embodiment. However the electrode may be a stripe electrode comprising a plurality of line electrodes arranged in a direction perpendicular to the longitudinal thereof. In this case, an insulating material may be provided between the line electrodes though need not be provided.

The recording photoconductive layer 2 may be formed of any material which becomes conductive upon exposure to the recording light. For example, the recording photoconductive layer 2 may be formed of a photoconductive material containing therein at least one of a-Se; lead oxide (II) or lead iodide (II) such as Pbo, $PbI_2$, or the like; $Bi_{12}(Ge, Si)O_{20}$; and $Bi_2I_3$/organic polymer nano-composite. Among these photoconductive materials, a-Se is most advantageous in that it is relatively high in quantum efficiency to radiation and high in dark resistance.

When the recording photoconductive layer 2 is of a material containing therein a-Se as a major component, the thickness of the recording photoconductive layer 2 is preferably not smaller than 50 $\mu$m and not larger than 1000 $\mu$m. When the recording photoconductive layer 2 is in the range in thickness, it can sufficiently absorb the recording light.

When the recording photoconductive layer 2 is of a material containing therein a-Se as a major component, the problem of bulk crystallization is apt to occur.

As the charge transfer layer 3, those in which the difference in mobility between negative and positive charges is larger (e.g.,not smaller than $10^2$, and preferably not smaller than $10^3$) is better, and organic compounds such as N-polyvinyl carbazole (PVK), N,N'-diphenyl-N,N'-bis(3-methylphenyl)-[1,1'-biphenyl]-4,4'-diamine (TPD), and a discotheque liquid crystal; dispersion of TPD in polymer (polycarbonate, polystyrene, PUK or the like); or semiconductors such as a-Se doped with 10 to 200 ppm of Cl are suitable. Especially, organic compounds such as PVK, TPD and discotheque liquid crystals are preferred because of their insensitivity to light. That is, those organic compounds hardly exhibits conductivity upon exposure to the recording light or the reading light. Further, since those organic compounds are generally small in dielectric constant, which makes smaller the capacities of the charge transfer layer 3 and the reading photoconductive layer 4 and increases the signal fetch efficiency upon reading. When the charge transfer layer 3 is of a material containing therein a-Se as a major component (e.g., a-Se doped with 10 to 200 ppm of Cl), the problem of bulk crystallization is apt to occur.

When the charge transfer layer is higher in charge mobility in the vertical direction (the direction of thickness of the layer) than that in the horizontal direction, the electric charge of the transfer polarity can move at high speed in the vertical direction and is less apt to move in the horizontal direction, whereby sharpness can be enhanced. As the material of the charge transfer layer, discotheque liquid crystals, hexapentyloxytriphenylene (Physical Review LETTERS 70.4, 1933), discotheque liquid crystals containing a $\pi$ conjugate condensed ring or transition metal in its core (EKISHO VOL No. 1 1997 P55) and the like are suitable.

When the charge transfer layer 3 is in the form of a laminated positive hole transfer layer comprising a first charge transfer layer which is of a material substantially insulating to a charge of the same polarity as the latent image polarity and a second charge transfer layer which is substantially conductive to a charge of the polarity opposite to the latent image polarity with the first charge transfer layer faced toward the recording photoconductive layer 2 and the second charge transfer layer faced toward the reading photoconductive layer 4, the first charge transfer layer comes to exhibit high resistance to the electric charge of the latent image polarity while the second charge transfer layer comes to transfer the electric charge of the transfer polarity at high speed, whereby the charge transfer layer can be excellent in afterimage and response speed to reading. Specifically, the first charge transfer layer may be a PVK layer or a TPD layer (an organic layer) 0.1 to 1 $\mu$m thick and the second charge transfer layer may be a layer of a-Se 5 to 30 $\mu$m thick doped with 10 to 200 ppm of Cl so that the second charge transfer layer is thicker than the first charge transfer layer. Also, in this case, the problem of bulk crystallization is apt to occur since the second charge transfer layer is of a material containing therein a-Se as a major component.

A layer of PVK is higher in tendency to act as a substantially insulating material to the electric charge of the same polarity as the latent image polarity (negative in the aforesaid example) than a layer of TPD, and a layer of TPD is higher in tendency to act as a substantially conductive material to the electric charge of the transfer polarity (positive in the aforesaid example) than a layer of PVK. Accordingly, the charge transfer layer may comprise a layer of TPD and a layer of PVK superposed so that the layer of TPD is faced toward the reading photoconductive layer 2 and the layer of PVK is faced toward the recording photoconductive layer 4.

The charge transfer layer 3 may comprise three of more layers. In this case, the layers are superposed so that tendency to act as a substantially insulating material to the electric charge of the same polarity as the latent image polarity is increased toward the recording photoconductive layer 2 and tendency to act as a substantially conductive material to the electric charge of the transfer polarity is increased toward the reading photoconductive layer 4.

The reading photoconductive layer 4 may be suitably formed of photoconductive material which includes as its major component at least one of a-Se, Se—Te, Se—As—Te, metal-free phthalocyanine, metallophthalocyanine, MgPC (magnesium phthalocyanine), VoPc (phase II of vanadyl phthalocyanine) and CuPc (copper phthalocyanine).

Further, when the reading photoconductive layer 4 is of a material which is high in sensitivity to an electromagnetic wave in near-ultraviolet to blue region (300 to 550 nm) and low in sensitivity to an electromagnetic wave in red region (not shorter than 700 nm), e.g., a photoconductive material containing as a major component at least one of a-Se, $PbI_2$, $Bi_{12}(Ge, Si)\ O_{20}$, perylenebisimide (R=n-propyl) and perylenebisimide (R=n-neopentyl), the reading photoconductive layer 4 can be large in band gap and accordingly can be small in dark current due to heat, whereby noise caused by the dark current can be reduced by using an electromagnetic wave in near-ultraviolet to blue region as the reading light.

It is preferred that the sum of the thickness of the charge transfer layer 3 and the thickness of the reading photoconductive layer 4 be not larger than ½ of the thickness of the recording photoconductive layer 2, and the smaller the sum of the thickness of the charge transfer layer 3 and the thickness of the reading photoconductive layer 4 is (e.g., not larger than 1/10 or 1/20 of the recording photoconductive layer 2), the higher the reading response is.

In this embodiment, the reading photoconductive layer 4 is of a material containing therein a-Se as a major component and is 0.05 to 0.5 $\mu$m thick.

By replacing the second charge transfer layer of a-Se doped with 10 to 200 ppm of Cl by an a-Se layer 5 to 30 $\mu$m thick, the a-Se layer can be caused to double the second charge transfer layer and the reading photoconductive layer 4. With this arrangement, a relatively excellent image recording medium can be manufactured with the manufacturing procedure simplified. Also in this case, the problem of bulk crystallization is apt to occur since the reading photoconductive layer 4 is of a material containing therein a-Se as a major component.

The problem of bulk crystallization which is caused when the recording photoconductive layer 2, the reading photoconductive layer 4 and/or the charge transfer layer 3 is formed of a material containing therein a-Se as a major component and a method of overcoming the problem will be described, hereinbelow.

As is well known, in an a-Se film, crystallization progresses with time, which can give rise to a so-called bulk crystallization problem that especially the dark resistance deteriorates. The bulk crystallization significantly occurs when the a-Se film is of non-doped or pure a-Se and progresses at higher speed as the temperature is higher.

Accordingly, when the recording photoconductive layer 2, the reading photoconductive layer 4 and/or the charge transfer layer 3 is formed of non-doped a-Se, the image recording medium 10 is severely limited in working temperature and service life.

Further, as is well known, when a-Se is doped with a predetermined material, especially As, progress of bulk crystallization can be slowed down. However, when a-Se is doped with an excessive amount of As, positive hole traps are increased to give rise to a problem that the inherent functions of the photoconductive layer deteriorate. In order to avoid this problem, the As doping amount is preferably limited to 0.1 to 0.5 atom %, and more preferably 0.33 atom %. The charge transfer layer 3 may be doped with any bulk crystallization suppressing material without limited to As.

In order to positively avoid the problem, the charge transfer layer may be doped with a very small amount of, e.g., 10 to 50 ppm, Cl in addition to As. As disclosed in "Time-of-Flight Study of Compensation Mechanism in a-Se Alloys" (JOURNAL OF IMAGING SCIENCE AND TECHNOLOGY/Vol. 41, Number 2, March/April 1997), by doping pure a-Se with 0.33 atom % of As together with about 30 to 40 ppm of Cl, increase in the positive hole traps due to As-dope can be compensated for by Cl-dope.

By doping the recording photoconductive layer and/or the reading photoconductive layer of pure a-Se material with such a small amount of As and Cl, a long service life image recording medium which is excellent in S/N ratio and withstands a relatively high temperature can be realized without involving a severe adverse effect.

When the recording photoconductive layer 2 contains a large amount of non-doped a-Se, interfacial crystallization is apt to occur on the surface of the recording photoconductive layer 2 due to heat generated upon deposition of the recording light side electrode layer 1 on the recording photoconductive layer 2. When interfacial crystallization occurs, direct injection of a charge from the electrode 1 into the recording photoconductive layer 2 occurs during recording (to be described later) when a high electric voltage is applied, which can result in deterioration in S/N ratio.

When the recording photoconductive layer is formed by resistance heating deposition of an alloy material containing therein Se as a major component and doped with 0.1 to 0.5 atom % of As and 10 to 50 ppm of Cl, the As concentration at the extreme surface of the recording photoconductive layer 2 facing the interface between the recording light side electrode layer 1 and the recording photoconductive layer 2 can be made higher than that inside the bulk by use of effect of fractional distillation during the resistance heating deposition.

The As concentration at the extreme surface of the recording photoconductive layer 2 can be made higher than that inside the bulk by use of effect of fractional distillation during the resistance heating deposition by effecting deposition at a suitable temperature taking into account the melting points and vapor pressures of AsSe and Se. In the resistance heating deposition, the alloy material evaporated, for instance, in a crucible by resistance heating is deposited from below on the surface of the support fixed above. During such a resistance heating deposition, Se is first deposited and then AsSe concentration is gradually increased due to the melting points and vapor pressures of AsSe and Se. As a result, the As concentration becomes higher in the surface area of the recording photoconductive layer 2 than inside the bulk. For this purpose, the resistance heating deposition of the alloy material is effected at 300° C. though deposition of AsSe is generally effected at about 400° C. In order to obtain the effect of fractional distillation by effecting deposition at a relatively low temperature, the resistance heating deposition is suitable. It is theoretically difficult to use the electron beam deposition or sputtering.

By making higher the As concentration in the surface area of the recording photoconductive layer 2 than inside the bulk, the interfacial crystallization is prevented when the recording light side electrode layer 1 is deposited on the recording photoconductive layer 2 and deterioration in S/N ratio can be suppressed. Further, in accordance with our experiment, use of an alloy material containing Se as a major component and doped with 0.35 atom % of As and 20 ppm of Cl resulted in better interfacial crystallization prevention than use of an alloy material containing Se as a major component and doped with 1.0 atom % of As. This result means interfacial crystallization prevention by increasing the As concentration can be enhanced by using an alloy material doped with Cl in addition to As.

In order to enhance the effect of increasing the As concentration in the surface area of the recording photoconductive layer, the thickness of the recording photoconductive layer 2 is preferably 200 to 1000 μm, more preferably 400 to 1000 μm and most preferably 700 to 1000 μm.

When the charge transfer layer 3 is caused to function as a positive hole transfer layer, doping the charge transfer layer 3 with As deteriorates the positive hole transfer function of the charge transfer layer 3. Accordingly, it is not preferred to dope the positive hole transfer layer with only As in order to prevent bulk crystallization. As described above, increase in the positive hole traps can be compensated for by further doping with Cl. When a charge transfer layer 3 of a material containing a-Se as major component and doped with 10 to 200 ppm of Cl functions as a positive hole transfer layer, progress of bulk crystallization can be slowed down without deteriorating the positive hole transfer function by doping with As in an amount of 0.1 to 0.5 atom % and with Cl in an amount of 20 to 250 ppm. Also in this case, when As and Cl are added in a proportion of 0.33 atom % and 30 to 40 ppm, the positive hole transfer function is hardly deteriorated.

Figure 2:
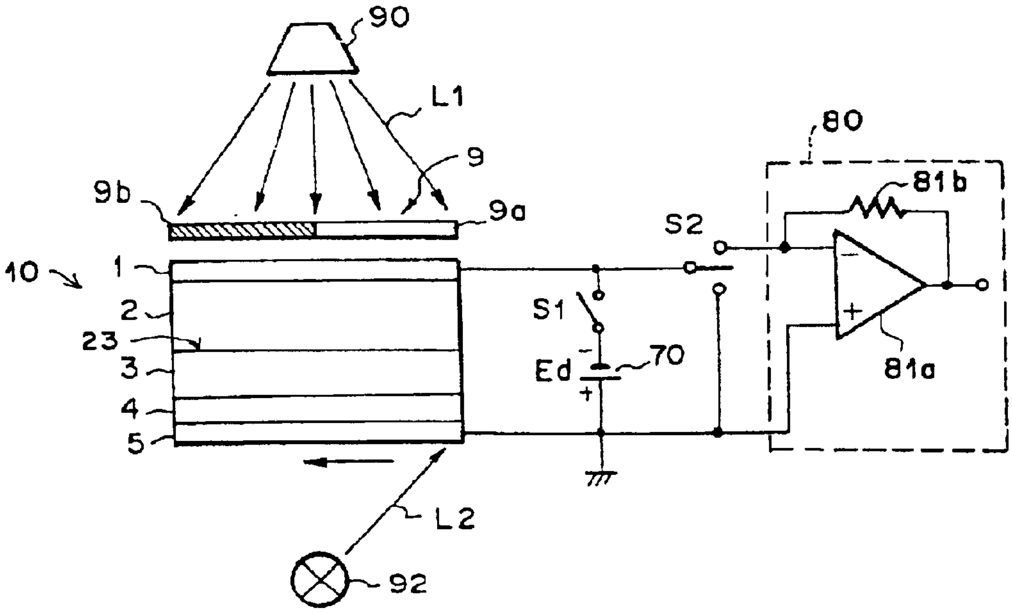
FIG. 2 is a schematic view showing an electrostatic latent image recording apparatus using the image recording medium of the first embodiment together with an electrostatic latent image reading apparatus.

A method of recording an image as a latent image on the image recording medium 10 and a method of reading out the latent image from the image recording medium 10 will be briefly described, hereinbelow. FIG. 2 shows an electrostatic latent image recording apparatus using the image recording medium 10 together with an electrostatic latent image reading apparatus using the image recording medium 10. In this specification the electrostatic latent image recording apparatus together with the electrostatic latent image reading apparatus will be referred to as the recording/reading apparatus. In FIG. 2, the support 8 is abbreviated.

In FIG. 2, the recording/reading apparatus comprises an image recording medium 10, a recording light projecting means 90, a first switching means S1, a power source 70, an electric current detecting circuit 80 formed by a second switching means S2 and a detecting amplifier 81 and a reading light projecting means. The image recording medium 10, the power source 70, the recording light projecting means 90 and the first switching means S1 form a latent radiation image recording system and the image recording medium 10, the electric current detecting circuit 80, the reading light projecting means 92 and the second switching means S2 form a latent radiation image reading system.

The detecting amplifier 81 comprises an operational amplifier 81*a* and a feedback resistor 81*b* and forms a so-called current/voltage conversion circuit. The detecting amplifier 81 need not be limited to such a structure and maybe, for instance, in the form of a charge amplifier.

The recording side electrode layer 1 of the image recording medium 10 is connected to the negative pole of the power source 70 through the first switching means S1 and to a movable contact of the second switching means S2. The second switching means S2 has a pair of fixed contacts, one of which (a first fixed contact) is connected to an inversion input terminal of the operational amplifier and the other of which (a second fixed contact) is grounded. The reading light side electrode layer of the image recording medium 10, the positive pole of the power source 70 and the non-inversion input terminal (+) are grounded.

An object 9 is placed on the upper surface of the recording light side electrode layer 1 of the image recording medium 10. The object 9 comprises a permeable part 9*a* which is permeable to the recording light L1 and an impermeable part 9*b* which is impermeable to the recording light L1. The object 9 is uniformly exposed to the recording light L1 by the recording light projecting means 90. The reading light projecting means 92 causes the reading light L2 to scan the image recording medium 10 in the direction of the arrow in FIG. 2. The reading light L2 is preferably converged into a beam of small diameter.

When a direct voltage Ed is applied between the recording light side electrode layer 1 and the reading light side electrode layer 5 from the power source 70 by closing the first switching means S1 with the second switching means S2 kept open, i.e., with the movable contact kept away from both the first and second fixed contacts, the recording light side electrode layer 1 is negatively charged and the reading light side electrode layer 5 is positively charged, whereby a parallel electric field is established between the recording light side electrode layer 1 and the reading light side electrode layer 5 in the image recording medium 10.

Thereafter the object 9 is uniformly exposed to the recording light L1 from the recording light projecting means 90. The part of the recording light L1 passing through the permeable part 9*a* of the object 9 impinges upon the recording photoconductive layer 2 through the recording light side electrode layer 1. The part of the recording photoconductive layer 2 exposed to the recording light L1 generates pairs of electron (the charge of the latent image polarity in this particular embodiment) and positive hole (the charge of the transfer polarity in this particular embodiment) according to the amount of the recording light L1 to which the part is exposed and becomes conductive.

The positive charge generated in the recording photoconductive layer 2 moves toward the recording light side electrode layer 1 at high speed and encounters the negative charge of the recording light side electrode layer 1 at the interface of the recording photoconductive layer 2 and the recording light side electrode layer 1 to cancel each other by recombination. The negative charge generated in the radioconductive layer 2 moves toward the charge transfer layer 3. Since the charge transfer layer 3 behaves as a substantially insulating material to the electric charge of the latent image polarity (negative in this particular embodiment), the negative charge is stopped at the charge accumulating portion 23 formed on the interface of the recording photoconductive layer 2 and the charge transfer layer 3 and is accumulated in the charge accumulating portion 23. The amount of charge accumulated in the charge accumulating portion 23 depends upon the amount of the negative charge generated in the recording photoconductive layer 2 upon exposure to the recording light L1, that is, the amount of the recording light L1 passing through the object 9. To the contrast, the part of the recording photoconductive layer 2 behind the impermeable part 9*b* of the object 9 is kept unchanged since the part is not exposed to the recording light L1.

Thus, an electric charge is accumulated on the interface of the recording photoconductive layer 2 and the charge transfer layer 3 in a pattern corresponding to a radiation image of the object 9, that is, a latent radiation image is recorded.

The latent radiation image reading process in the image recording/reading apparatus shown in FIG. 2 will be described, hereinbelow.

The first switching means S1 is first opened to stop power supply to the image recording medium 10 from the power source 70 and the movable contact of the second switching means S2 is once connected to the second fixed contact connected to the ground so that the electrode layers 1 and 5 are charged at the same potential. After thus rearranging the charge, the movable contact of the second switching means S2 is connected to the first fixed contact connected to the detecting amplifier 81.

Then, when the reading light projecting means 92 causes the reading light L2 to scan the reading light side electrode layer 5, the reading light L2 impinges upon the reading photoconductive layer 4 through the reading light side electrode layer 5. The part of the photoconductive layer 4 exposed to the reading light L2 becomes conductive. This means that positive and negative charged pairs are generated upon exposure to the reading light L2.

A very strong electric field is formed between the charge accumulating portion 23 and the reading light side electrode layer 5 according to the amount of charge of the latent image polarity accumulated in the charge accumulating portion 23 and the sum of the thickness of the reading photoconductive layer 4 and the charge transfer layer 3. Since the charge transfer layer 3 is conductive to the charge of the transfer polarity (the positive charge in this particular embodiment), the positive charge generated in the photoconductive layer 4 moves toward the charge accumulating portion 23 at high speed attracted by the negative charge therein and encounters the negative charge to cancel each other by recombination. The negative charge generated in the photoconductive layer 4 encounters the positive charge of the reading light side electrode layer 5 and cancels each other by recombination. The photoconductive layer 4 is exposed to a sufficient amount of reading light L2, the whole charge of the latent image polarity in the charge accumulating portion 23 bearing thereon the latent image is canceled by charge recombination. That the charge on the image recording medium 10 is canceled means that the electric charge moves and an electric current flows in the image recording medium 10. By thus detecting the electric current flowing out from the image recording medium 10 by the current detecting circuit 80 while scanning the image recording medium 10 with reading light L2, the amounts of charges accumulated at respective parts of the image recording medium 10 can be read out in sequence, whereby an image signal can be obtained.

As the sum of the thickness of the reading photoconductive layer 4 and the charge transfer layer 3 becomes smaller as compared with the thickness of the recording photoconductive layer 2, the charge moves higher speed and the reading speed increases. Further, when the mobility of the negative charge in the charge transfer layer 3 is sufficiently lower than that of the positive charge (e.g., not higher than $1/10^3$), the charge is better accumulated in the charge accumulating portion 23 and the electrostatic latent image is better preserved.

Though, in the embodiment described above, each of the recording photoconductive layer 2, the charge transfer layer 3 and the reading photoconductive layer 4 is formed of a material containing a-Se as a major component and the present invention is applied to suppress bulk crystallization of the recording photoconductive layer 2, the charge transfer layer 3 and the reading photoconductive layer 4, the present invention can be applied also to image recording media in which only one or two of the recording photoconductive layer 2, the charge transfer layer 3 and the reading photoconductive layer 4 is formed of a material containing a-Se as a major component.

Further, though in the embodiment described above, the recording light side electrode layer 1 is negatively electrified while the reading light side electrode layer 5 is positively electrified and a negative charge is accumulated in the charge accumulating portion 23, the present invention may be applied to the image recording medium where the recording light side electrode layer 1 is positively electrified while the reading light side electrode layer 5 is negatively electrified and a positive charge is accumulated in the charge accumulating portion 23.

The reading light side electrode layer 5 may be in the form of a stripe electrode comprising a plurality of line electrodes arranged in the transverse direction thereof. When the reading light side electrode layer 5 is in the form of a stripe electrode, correction of structure noise is facilitated, the S/N ratio of the image can be improved since the capacity of the electrode layer is reduced, the reading efficiency can be increased and the S/N ratio can be increased by enhancing the electric field by localizing the latent image according to the pattern of the stripe electrode, and parallel reading can be realized (especially in the main scanning direction) to reduce the reading time by connecting each line electrode to a detecting amplifier, using a line beam extending in the transverse direction of the line electrodes as the reading light and causing the line beam to scan the electrodes in the longitudinal direction of the electrodes.

Though, in the embodiment described above, the charge accumulating portion is formed between the recording photoconductive layer and the charge transfer layer, it may be formed as a trap layer which traps and accumulates the electric charge of the latent image polarity as disclosed in U.S. Pat. No. 4,535,468.

Bulk crystallization of the layer containing a-Se as a major component in image recording media having a layer arrangement different from that in the image recording medium of the present invention can be prevented in the light of the arrangement of the present invention.

Figure 3A:
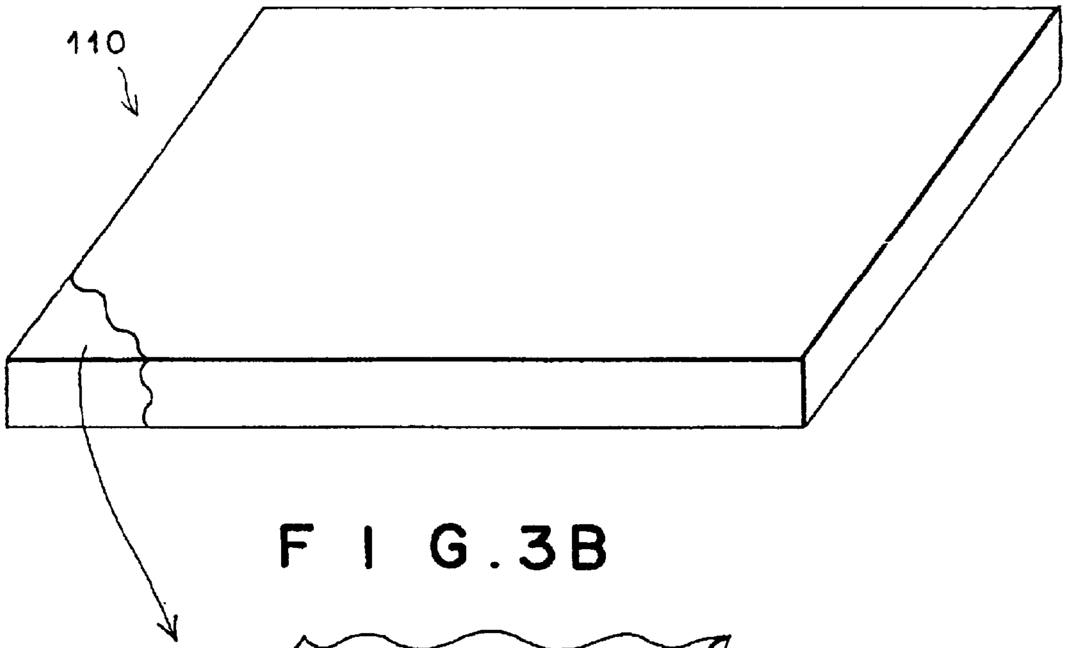
FIG. 3A is a perspective view of an image recording medium in accordance with a second embodiment of the present invention.
Figure 3B:
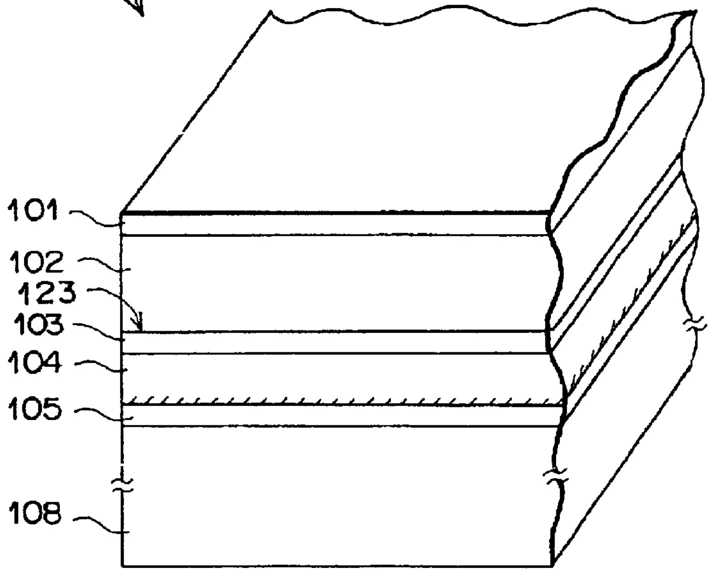
FIG. 3B is a cross-sectional view of a part of the image recording medium shown in FIG. 3A.

An image recording medium 110 in accordance with a second embodiment of the present invention will be described with reference to FIGS. 3A and 3B, hereinbelow. As shown in FIGS. 3A and 3B (especially in FIG. 3B), an image recording medium 110 in accordance with a second embodiment of the present invention comprises a support 108 permeable to reading light (e.g., blue region light not longer than 550 nm in wavelength), and a reading light side electrode layer 105 permeable to the reading electromagnetic light, a reading photoconductive layer 104 which exhibits conductivity upon exposure to the reading light, a charge transfer layer 103 which behaves like a substantially insulating material to an electric charge of a latent image polarity at which a recording light side electrode layer 101 is electrified and behaves like a substantially conductive material to the electric charge of the polarity opposite to the latent image polarity, the recording photoconductive layer 102 which exhibits conductivity upon exposure to recording light (e.g., a radiation such as x-rays) and a recording light side electrode layer 101 permeable to the recording light which are superposed on the support 108 one on another in this order. A charge accumulating portion 123 which accumulates an electric charge of the latent image polarity generated in the recording photoconductive layer 102 is formed at the interface between the recording photoconductive layer 102 and the charge transfer layer 103.

When manufacturing the image recording medium 110 of this embodiment, the reading light side electrode layer 105 is first formed on the support 108, and then the reading photoconductive layer 104, the charge transfer layer 103, the recording photoconductive layer 102 and the recording light side electrode layer 101 are superposed on the reading light side electrode layer 105 in this order.

The image recording medium 110 may be not smaller than 20×20 cm and, when to be used as a recording medium in chest radiography, may be 43×43 cm in effective size.

The support 108 should be of a material which is transparent to the reading light, is deformable with change in the environmental temperature and is in the range of a fraction to several times of the material of the reading photoconductive layer 104 in thermal expansion coefficient. Preferably the material of the support 108 is substantially the same as the material of the reading photoconductive layer 104. Since the reading photoconductive layer 104 is of a-Se, it is preferred that the support 108 is of a material whose thermal expansion coefficient is 1.0 to $10.0\times10^{-5}$/K. (40° C.) taking into account that the thermal expansion coefficient of Se is $3.68\times10^{-5}$/K. (40° C.). More preferably the support 108 is of a material whose thermal expansion coefficient is 1.2 to $6.2\times10^{-5}$/K. (40° C.) and most preferably 2.2 to $5.2\times10^{-5}$/K. (40° C.). For example, an organic polymer material may be used.

For example, polycarbonate whose thermal expansion coefficient is $7.0\times10^{-5}$/K. (40° C.) and polymethyl methacrylate (PMMA) whose thermal expansion coefficient is $5.0\times10^{-5}$/K. (40° C.) can be used.

With this arrangement, the support 108 and the reading photoconductive layer (a-Se film) 104 can be matched with each other in thermal expansion so that failure due to the difference in thermal expansion coefficient, e.g., breakage of the reading photoconductive layer 104 and/or the support 108 and/or peeling from each other due to thermal stress, can be avoided even if the image recording medium 110 is subjected to a large temperature change cycle, for instance, during transportation by ship in a cold country. Further, the support of an organic polymer support is stronger against impact than a glass support.

The recording light side electrode layer 101 and the reading light side electrode layer 105 should be permeable respectively to the recording light and the reading light. For example, a nesa film ($SnO_2$), an ITO film (indium tin oxide) or an IDIOX film (Idemitsu Indium X-metal Oxide: amorphous transparent oxide film; IDEMITSU KOUSAN) in a thickness of 50 to 200 nm may be employed. When an X-ray is used as the recording light, the recording light side electrode layer 101 need not be transparent to visible light and accordingly, may be of, for instance, Al or Au in a thickness of 100 nm.

Each of the recording light side electrode layer 101 and the reading light side electrode layer 105 is a flat electrode layer in this particular embodiment. However the electrode layer may be a stripe electrode layer comprising a plurality of line electrodes arranged in a direction perpendicular to the longitudinal thereof. In this case, an insulating material may be provided between the line electrodes though need not be provided.

The recording photoconductive layer 102 may be formed of any material which becomes conductive upon exposure to the recording light. For example, the recording photoconductive layer 102 may be formed of a photoconductive material containing therein at least one of a-Se; lead oxide (II) or lead iodide (II) such as PbO, $PbI_2$, or the like; $Bi_{12}(Ge, Si)O_{20}$; and $Bi_2I_3$/organic polymer nanocomposite. Among these photoconductive materials, a-Se is most advantageous in that it is relatively high in quantum efficiency to radiation and high in dark resistance.

When the recording photoconductive layer 102 is of a material containing therein a-Se as a major component, the thickness of the recording photoconductive layer 102 is preferably not smaller than 50 μm and not larger than 1000 μm. When the recording photoconductive layer 102 is in the range in thickness, it can sufficiently absorb the recording light.

As the charge transfer layer 103, those in which the difference in mobility between negative and positive charges is larger (e.g., not smaller than $10^2$, and preferably not smaller than $10^3$) is better, and organic compounds such as N-polyvinyl carbazole (PVK), N,N'-diphenyl-N,N'-bis(3-methylphenyl)-[1,1'-biphenyl]-4,4'-diamine (TPD), and a discotheque liquid crystal; dispersion of TPD in polymer (polycarbonate, polystyrene, PUK or the like); or semiconductors such as a-Se doped with 10 to 200 ppm of Cl are suitable. Especially, organic compounds such as PVK, TPD and discotheque liquid crystals are preferred because of their insensitivity to light. That is, those organic compounds hardly exhibits conductivity upon exposure to the recording light or the reading light. Further, since those organic compounds are generally small in dielectric constant, which makes smaller the capacities of the charge transfer layer 103 and the reading photoconductive layer 104 and increases the signal fetch efficiency upon reading.

When the charge transfer layer is higher in charge mobility in the vertical direction (the direction of thickness of the layer) than that in the horizontal direction, the electric charge of the transfer polarity can move at high speed in the vertical direction and is less apt to move in the horizontal direction, whereby sharpness can be enhanced. As the material of the charge transfer layer, discotheque liquid crystals, hexapentyloxytriphenylene (Physical Review LETTERS 70.4, 1933), discotheque liquid crystals containing a π conjugate condensed ring or transition metal in its core (EKISHO VOL No. 1 1997 P55) and the like are suitable.

When the charge transfer layer 103 is in the form of a laminated positive hole transfer layer comprising a first charge transfer layer which is of a material substantially insulating to a charge of the same polarity as the latent image polarity and a second charge transfer layer which is substantially conductive to a charge of the polarity opposite to the latent image polarity with the first charge transfer layer faced toward the recording photoconductive layer 102 and the second charge transfer layer faced toward the reading photoconductive layer 104, the first charge transfer layer comes to exhibit high resistance to the electric charge of the latent image polarity while the second charge transfer layer comes to transfer the electric charge of the transfer polarity at high speed, whereby the charge transfer layer can be excellent in afterimage and response speed to reading. Specifically, the first charge transfer layer may be a PVK layer or a TPD layer (an organic layer) 0.1 to 1 μm thick and the second charge transfer layer may be a layer of a-Se 5 to 30 μm thick doped with 10 to 200 ppm of Cl so that the second charge transfer layer is thicker than the first charge transfer layer.

A layer of PVK is higher in tendency to act as a substantially insulating material to the electric charge of the same polarity as the latent image polarity (negative in the aforesaid example) than a layer of TPD, and a layer of TPD is higher in tendency to act as a substantially conductive material to the electric charge of the transfer polarity (positive in the aforesaid example) than a layer of PVK. Accordingly, the charge transfer layer may comprise a layer of TPD and a layer of PVK superposed so that the layer of TPD is faced toward the reading photoconductive layer 102 and the layer of PVK is faced toward the recording photoconductive layer 104.

The charge transfer layer 103 may comprise three of more layers. In this case, the layers are superposed so that tendency to act as a substantially insulating material to the electric charge of the same polarity as the latent image polarity is increased toward the recording photoconductive layer 102 and tendency to act as a substantially conductive material to the electric charge of the transfer polarity is increased toward the reading photoconductive layer 104.

The reading photoconductive layer 104 may be suitably formed of photoconductive material which includes as its major component at least one of a-Se, Se—Te, Se—As—Te, metal-free phthalocyanine, metallophthalocyanine, MgPC (magnesium phthalocyanine), VoPc (phase II of vanadyl phthalocyanine) and CuPc (copper phthalocyanine).

Further, when the reading photoconductive layer 104 is of a material which is high in sensitivity to an electromagnetic wave in near-ultraviolet to blue region (300 to 550 nm) and low in sensitivity to an electromagnetic wave in red region (not shorter than 700 nm), e.g., a photoconductive material containing as a major component at least one of a-Se, $PbI_2$, $Bi_{12}(Ge, Si)O_{20}$, perylenebisimide (R=n-propyl) and perylenebisimide (R=n-neopentyl), the reading photoconductive layer 104 can be large in band gap and accordingly can be small in dark current due to heat, whereby noise caused by the dark current can be reduced by using an electromagnetic wave in near-ultraviolet to blue region as the reading light.

It is preferred that the sum of the thickness of the charge transfer layer 103 and the thickness of the reading photoconductive layer 104 be not larger than ½ of the thickness of the recording photoconductive layer 102, and the smaller the sum of the thickness of the charge transfer layer 103 and the thickness of the reading photoconductive layer 104 is (e.g., not larger than 1/10 or 1/20 of the recording photoconductive layer 2), the higher the reading response is.

In this embodiment, the reading photoconductive layer 4 is of a material containing therein a-Se as a major component and is 0.05 to 0.5 μm thick.

By replacing the second charge transfer layer of a-Se doped with 10 to 200 ppm of Cl by an a-Se layer 5 to 30 μm thick, the a-Se layer can be caused to double the second charge transfer layer and the reading photoconductive layer 104. With this arrangement, a relatively excellent image recording medium can be manufactured with the manufacturing procedure simplified.

It has been known that interfacial crystallization progresses on an interface between an a-Se film and another material during the step of depositing films. Also in the image recording medium 110 of this embodiment, when the reading photoconductive layer 104 is deposited on the reading light side electrode layer 105, the interfacial crystallization is apt to progress on the interface therebetween, which causes an electric charge to be directly injected into the reading photoconductive layer 104 from the reading light side electrode layer 105, which deteriorates the S/N ratio. When the electrode layer 105 is of a transparent oxide film, especially an ITO film, the interfacial crystallization markedly progresses and deterioration in S/N ratio is significant.

In the image recording medium 110 of this embodiment, the reading photoconductive layer 104 is doped in the surface area facing the reading light side electrode layer 105 with an interfacial crystallization suppressing material which suppresses interfacial crystallization of a-Se, which is equivalent to that a interfacial crystallization suppressing layer is formed between the reading photoconductive layer 104 and the reading light side electrode layer 105.

In this embodiment, as the interfacial crystallization suppressing material, As is employed in an amount of 0.5 to 40 atom %. When the doping amount of As is smaller than 0.5 atom %, interfacial crystallization preventing effect is not sufficient, whereas when the doping amount of As is larger than 40 atom %, crystallization other than crystallization of Se, such as $As_2Se_3$, becomes apt to occur. The interfacial crystallization suppressing material need not be limited to As.

When the thickness of the reading photoconductive layer 104 is in the range of 0.05 to 0.5 μm, the response speed in reading is not greatly affected even if the reading photoconductive layer 104 is doped with As in an amount of 0.5 to 5 atom % over the whole. When the thickness of the reading photoconductive layer 104 exceeds the range, it is preferred that the reading photoconductive layer 104 be doped with As in an amount of 0.5 to 5 atom % only in the surface area facing the reading light side electrode layer 105.

Figure 4:
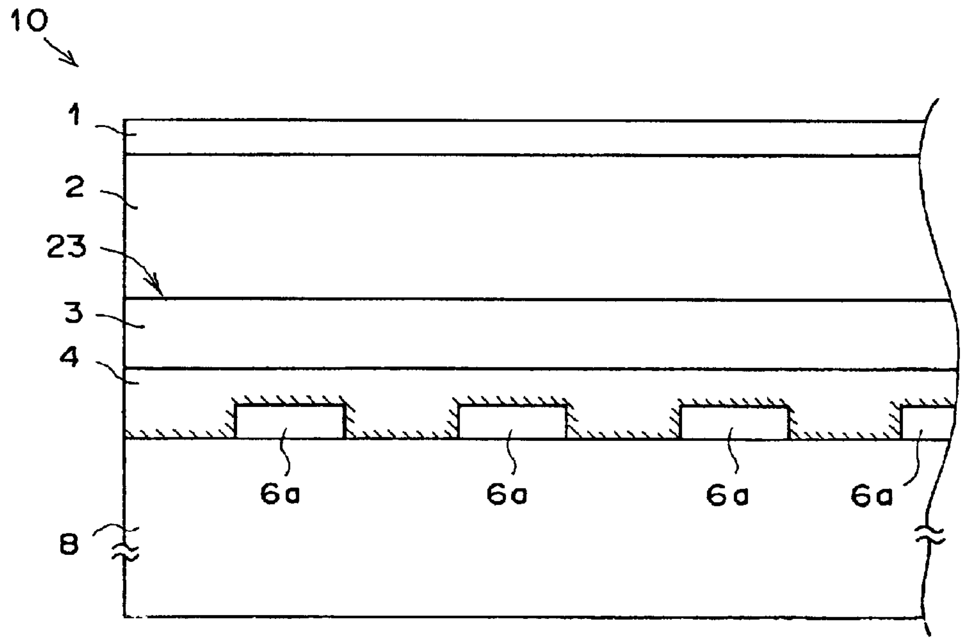
FIG. 4 is a fragmentary cross-sectional view showing modification of the image recording medium of the second embodiment.

When the reading light side electrode layer 105 is in the form of a stripe electrode comprising a plurality of elements (line electrodes) 106*a* as shown in FIG. 4, the reading photoconductive layer 104 is doped with As in the surface area facing the upper and side surfaces of each line electrode 106*a*. The As concentration maybe somewhat differ between the surface area facing the upper surface of the line electrodes 106*a* and the surface area facing the side surfaces of the line electrodes 106*a*. In this case, it is sufficient that the As concentration in the surface area facing the upper surface of the line electrodes 106*a* is about 0.5 to 5 atom %.

When the electrode of the reading light side electrode layer 105 is in direct contact with a-Se, a barrier electric field is formed therebetween, and an electric current can flow upon exposure to the reading light through a region which has not been exposed to the recording light, which generates photovoltaic noise and causes offset noise.

In order to suppress the photovoltaic noise, we has proposed, in our Japanese Patent Application 11(1999)-194546, to carry out "idle reading" where the reading photoconductive layer 104 is exposed to pre-exposure light with the electrode layers 101 and 105 held at the same potential, and then the recording light is projected onto the recording photoconductive layer to record an electrostatic latent image with a recording electric voltage applied between the electrode layers 101 and 105, whereby optical fatigue state (trap accumulating state) is temporarily formed on the light incident interface (electron/hole pair forming region) between the reading photoconductive layer 104 and the reading light side electrode layer 105 and photovoltaic noise which can be generated when the reading photoconductive layer 104 is exposed to the reading light is reduced by the optical fatigue state.

As described above, the reading photoconductive layer 104 is doped in the surface area facing the reading light side electrode layer 105 (strictly speaking the electrodes), i.e., the light incident interface, with As, and positive hole traps and electron traps are increased at the light incident interface. The pre-exposure forms optical fatigue state at portion exposed to the light and suppresses the photovoltaic noise. Increase in the positive hole traps and/or the electron traps by doping with As elongates durability of optical fatigue of the interface caused by pre-exposure and sometimes contributes to stabilization of offset noise. The portions not doped with As bears the carrier mobility.

However, it is difficult to control increase in the positive hole traps and/or the electron traps only by As doping. The electron traps can be increased by doping with Cl in an amount of 1 to 1000 ppm in addition to As. Positive hole traps can be increased by doping with Na in an amount of 1 to 1000 ppm in place of As. By selecting the kind of doping material and/or the amount of the doping material, the durability of the optical fatigue state can be controlled. The kind of doping material and/or the amount of the doping material may be selected according to the material of the reading light side electrode layer 105. When a blocking layer is provided between the reading light side electrode layer 105 and the reading photoconductive layer 105, the kind of doping material and/or the amount of the doping material may be selected according to the material of the blocking layer in addition to the material of the reading light side electrode layer 105.

As is well known, in an a-Se film, crystallization progresses with time, which can give rise to a so-called bulk crystallization problem that especially the dark resistance deteriorates. The bulk crystallization significantly occurs when the a-Se film is of non-doped or pure a-Se and progresses at higher speed as the temperature is higher.

Accordingly, when the recording photoconductive layer 2, the reading photoconductive layer 4 and/or the charge transfer layer 3 is formed of non-doped a-Se, the image recording medium 10 is severely limited in working temperature and service life.

Further, as is well known, when a-Se is doped with a predetermined material, especially As, progress of bulk crystallization can be slowed down. However, when a-Se is doped with an excessive amount of As, crystallization of, for instance, $As_2Se_3$ becomes apt to occur. In order to avoid this problem, the As doping amount is preferably limited to 0.1 to 0.5 atom %, and more preferably 0.33 atom %. The doping amount of As as used here is smaller than that used for suppressing the interfacial crystallization and is preferably not larger than 1/10 of the latter.

In order to positively avoid the problem, the charge transfer layer may be doped with a very small amount of, e.g., 10 to 50 ppm, Cl in addition to As. As disclosed in "Time-of-Flight Study of Compensation Mechanism in a-Se Alloys" (JOURNAL OF IMAGING SCIENCE AND TECHNOLOGY/Vol. 41, Number 2, March/April 1997), by doping pure a-Se with 0.33 atom % of As together with about 30 to 40 ppm of Cl, increase in the positive hole traps due to As-dope can be optimally compensated for by Cl-dope.

By doping the recording photoconductive layer and/or the reading photoconductive layer of pure a-Se material with such a small amount of As and Cl, a long service life image recording medium which is excellent in S/N ratio and withstands a relatively high temperature can be realized without involving a severe adverse effect. It is possible to dope the surface area of the reading photoconductive layer 104 facing the reading light side electrode layer 105 with As and the like for preventing the interfacial crystallization together with doping the reading photoconductive layer 104 for preventing the bulk crystallization. In this case, the As concentration differs inside the reading photoconductive layer 104 from in the surface area of the reading photoconductive layer 104. When doped with 0.5 atom % of As, both the bulk crystallization and the interfacial crystallization can be suppressed in the surface area of the reading photoconductive layer 104.

When the charge transfer layer 103 is caused to function as a positive hole transfer layer, doping the charge transfer layer 103 with As deteriorates the positive hole transfer function of the charge transfer layer 103. Accordingly, it is not preferred to dope the positive hole transfer layer with only As in order to prevent bulk crystallization. As described above, increase in the positive hole traps can be compensated for by further doping with Cl. When a charge transfer layer 103 of a material containing a-Se as major component and doped with 10 to 200 ppm of Cl functions as a positive hole transfer layer, progress of bulk crystallization can be slowed down without deteriorating the positive hole transfer function by doping with As in an amount of 0.1 to 0.5 atom % and with Cl in an amount of 20 to 250 ppm. Also in this case, when As and Cl are added in a proportion of 0.33 atom % and 30 to 40 ppm, the positive hole transfer function is hardly deteriorated.

Figure 5A:
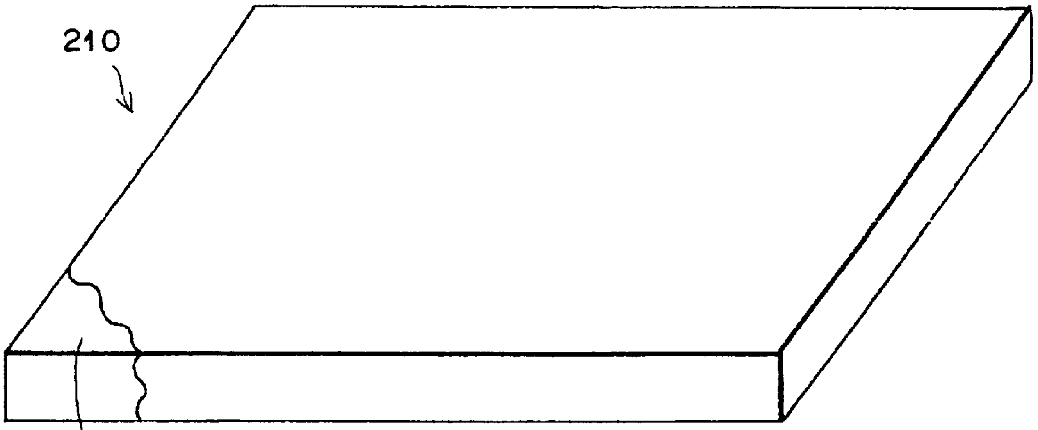
FIG. 5A is a perspective view of an image recording medium in accordance with a third embodiment of the present invention.
Figure 5B:
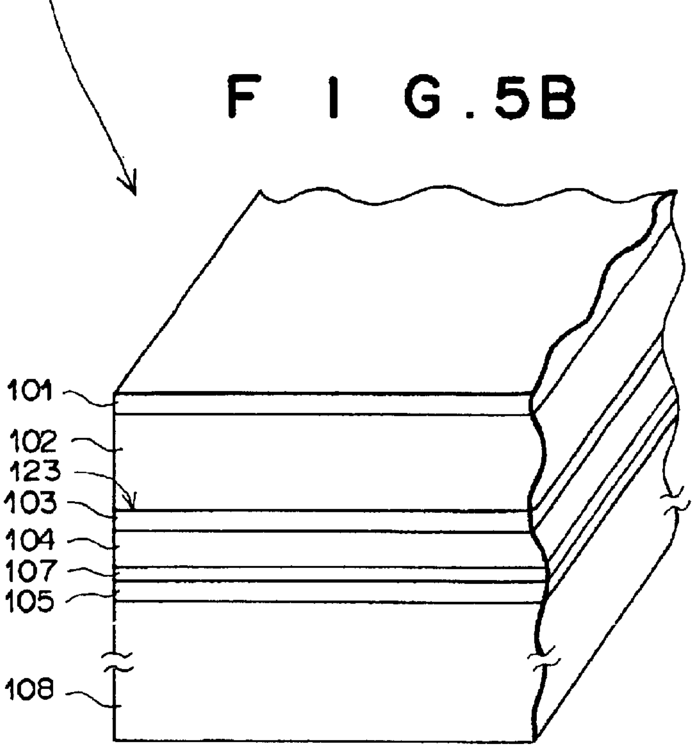
FIG. 5B is a cross-sectional view of a part of the image recording medium shown in FIG. 5A.

An image recording medium 210 in accordance with a third embodiment of the present invention will be described with reference to FIGS. 5A and 5B, hereinbelow.

The image recording medium 210 of the third embodiment is substantially the same as the image recording medium 110 of the second embodiment except that a blocking layer 107 is provided between the reading light side electrode layer 105 and the reading photoconductive layer 104. Accordingly, the elements analogous to those in the second embodiment are given the same reference numerals and will not be described in detail here. The blocking layer 107 is permeable to the reading light and has a blocking effect (has a barrier potential) against charge injection from the electrode of the reading light side electrode layer 105.

When there is no blocking layer as in the second embodiment, a part of the charge (positive in this particular embodiment) on the reading light side electrode layer 105 can be directly injected into the reading photoconductive layer 104. The positive charge directly injected into the reading photoconductive layer 104 moves in the charge transfer layer 103 and encounters the accumulated charge (the charge of latent image polarity) to cancel each other by recombination. Since being not caused by exposure to the reading light, the cancel of the accumulated charge generates a noise component. To the contrast, by providing the blocking layer 107 between the reading light side electrode layer 105 and the reading photoconductive layer 104, the positive charge on the reading light side electrode layer 105 is blocked by the barrier potential and generation of noise can be prevented.

The blocking layer 107 can function also as an interfacial crystallization suppressing layer. That is, the blocking layer 107 prevents a-Se from being in direct contact with the electrode material of the reading light side electrode 105, whereby chemical change of Se is prevented and interfacial crystallization of Se is prevented. Accordingly, charge injection from the electrode due to interfacial crystallization cannot be increased and the problem of deterioration in S/N can be overcome.

Further, in this particular embodiment, the blocking layer 107 is formed of an elastic material so that the blocking layer 107 can function as a cushion layer for relieving thermal stress between the support 108 and the reading photoconductive layer 104.

With this arrangement, thermal stress generated by the difference in thermal expansion of the support 108 and the reading photoconductive layer 104 can be relieved by the blocking layer 107, and accordingly, the material of the support 108 can be selected without taking into account the difference in thermal expansion coefficient between the support 108 and the reading photoconductive layer 104.

In order to cause the blocking layer 107 to double the interfacial crystallization suppressing layer and the cushion layer, it is preferred that the blocking layer 107 be formed of organic insulating polymer such as polyamide, polyimide, polyester, polyvinyl butyral, polyvinyl pyrrolidone, polyurethane, polymethyl methacrylate or polycarbonate which is transparent to the reading light and excellent in positive hole blocking performance. Further, the blocking layer 107 may be formed of a film of a mixture of an organic binder and about 0.3 to 3% by weight of a low-molecular organic material such as nigrosine.

The organic layer may generally be in the range of 0.05 to 5 μm in thickness. The thickness is preferably in the range of 0.1 to 5 μm in order to relieve the thermal stress and in the range of 0.5 to 0.5 μm in order to obtain an excellent blocking function without afterimage. A good compromise therebetween is 0.1 to 0.5 μm.

Figure 6A:
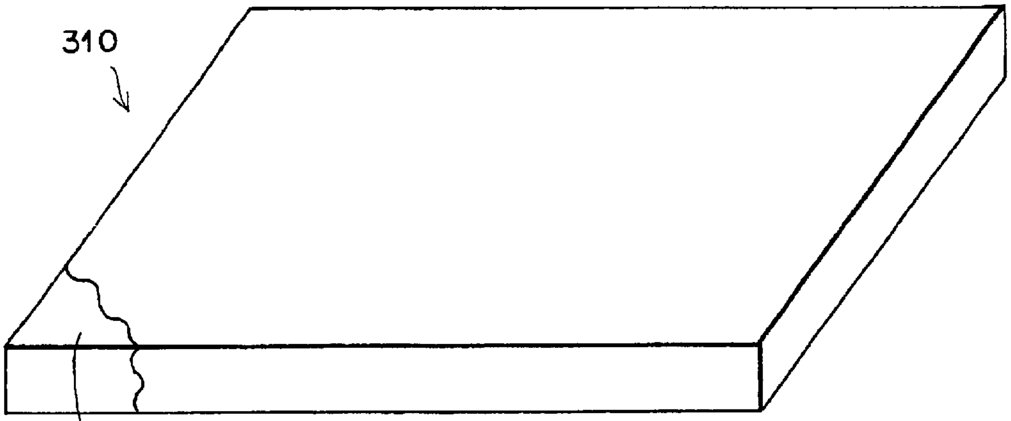
FIG. 6A is a perspective view of an image recording medium in accordance with a fourth embodiment of the present invention.
Figure 6B:
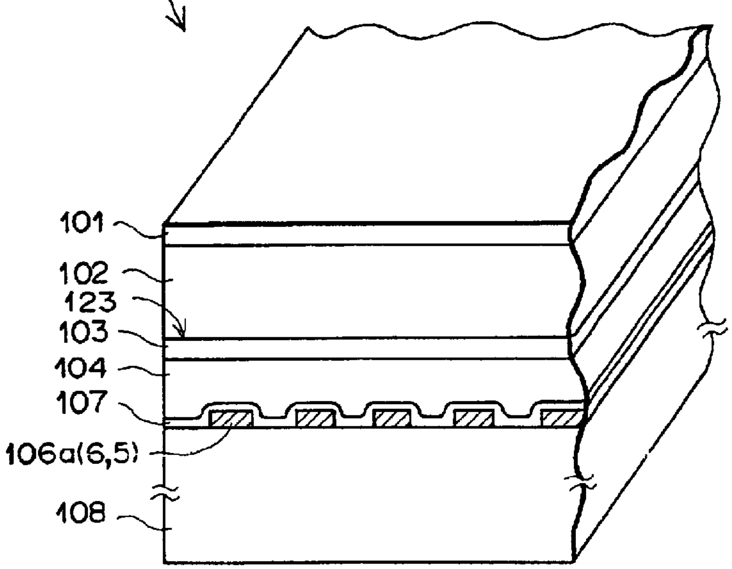
FIG. 6B is a cross-sectional view of a part of the image recording medium shown in FIG. 6A, FIGS. 7A to 7C are views for illustrating an example of a method of manufacturing the image recording medium of the fourth embodiment.

An image recording medium 310 in accordance with a fourth embodiment of the present invention will be described with reference to FIGS. 6A and 6B, hereinbelow. The elements analogous to those in the third embodiment are given the same reference numerals in FIGS. 6A and 6B and will not be described in detail here.

The image recording medium 310 of the fourth embodiment is substantially the same as the image recording medium 110 of the third embodiment except that the reading light side electrode 105 is provided with a stripe electrode 106 comprising a plurality of line electrodes 106*a* arranged at intervals equal to the pixel pitch. In this particular embodiment, the reading light side electrode 105 is formed of solely the stripe electrode 106 without filling the spaces between the line electrodes 106*a* and the blocking layer 107 is directly formed over the line electrodes 106*a*.

The blocking layer 107 in this embodiment also functions as an interfacial crystallization suppressing layer and can overcome the problem of deterioration in S/N ratio. As described above, when the reading light side electrode layer 105 is in the form of a stripe electrode, correction of structure noise is facilitated, the S/N ratio of the image can be improved since the capacity of the electrode layer is reduced, the reading efficiency can be increased and the S/N ratio can be increased by enhancing the electric field by localizing the latent image according to the pattern of the stripe electrode, and parallel reading can be realized (especially in the main scanning direction) to reduce the reading time.

Figure 7A:
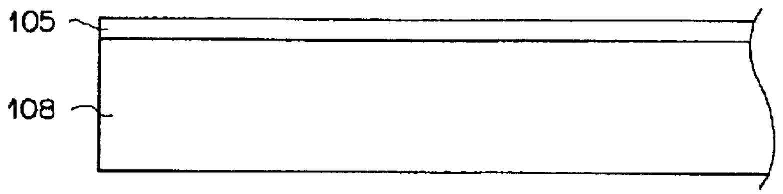

When manufacturing the image recording medium 310 of this embodiment, a film of transparent oxide such as of ITO or IDIOX which is easy to etch is formed on a support 108 in a predetermined thickness (e.g., about 200 nm), thereby forming the reading light side electrode 105 as shown in FIG. 7A.

Figure 7B:
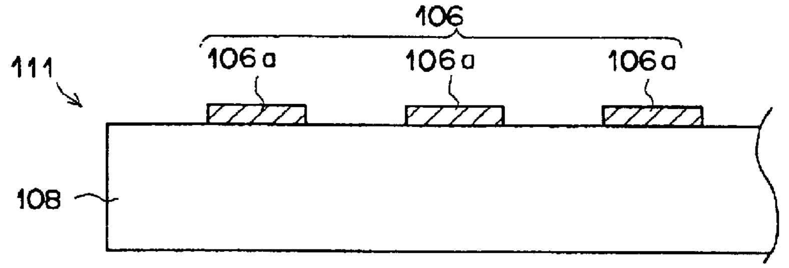

Then the transparent oxide film which is solid is shaped into a stripe electrode 106 comprising a plurality of line electrodes 106*a* by photo-etching or the like as shown in FIG. 7B. In this manner, a highly fine stripe pattern equivalent to the pixel pitch of 50 to 200 μm suitable for medical use can be formed at low cost.

Since IDIOX is a material easy to etch, when the line electrodes 106*a* are formed of IDIOX, fear of dissolving the support 108 during etching of the oxide film can be eliminated and the material of the support 108 can be selected from a wide variety of materials.

Then blocking layer material is applied in the longitudinal direction of the line electrodes 106*a* in a predetermined thickness (e.g., 200 nm), thereby forming the blocking layer 107. When the reading light side electrode 105 is solid as in the third embodiment, the blocking layer material may be applied in any direction and accordingly may be applied by spin coating. However, in the case of this embodiment, spin coating is not preferred.

Figure 7C:
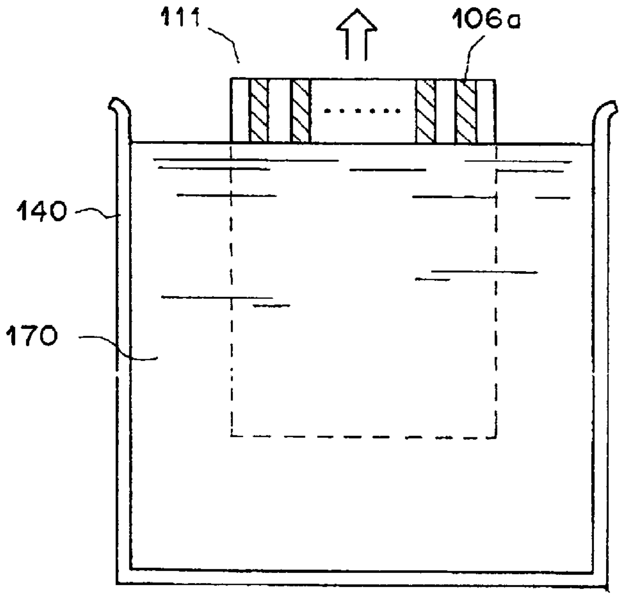

It is preferred that the blocking layer material be applied by a method such dipping, spraying, bar coating, screen coating or the like in which a nozzle, brush or the like is one-dimensionally moved. Dipping is advantageous in that the blocking layer 107 can be formed by simply dipping the support bearing thereon the stripe electrode in solvent and taking it out from the solvent, and that a large size blocking layer can be formed relatively easily. FIG. 7C briefly shows an example of the dipping method. That is, as shown in FIG. 7C, a container 140 is filled with a blocking layer material solution 170, and the support/stripe electrode assembly 111 is dipped in the solution 170 in the longitudinal direction of the line electrodes 106*a* and is taken out.

Figure 8A:
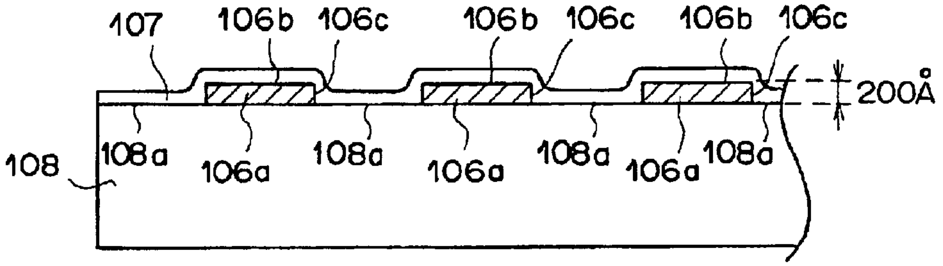
FIGS. 8A and 8B are views illustrating the image recording medium of the fourth embodiment in the course of manufacture.

FIG. 8A shows a state in which the blocking layer material has been applied in the longitudinal direction of the line electrodes 106*a* and the blocking layer 107 has been formed. As can be seen from FIG. 8A, the blocking layer 107 is continuous over the entire area of the upper surface 108*a* of the support 108 without broken at the edges of the line electrodes 106*a* and the upper surface 106*b* and side surfaces 106*c* of each line electrode 106*a* are completely covered with the blocking layer 107.

Figure 8B:
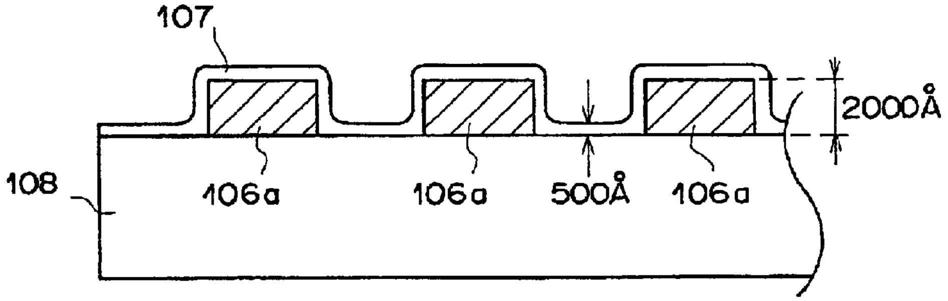

Further, even if the transparent oxide film is formed in a relatively large thickness (e.g., 2000 Å) (that is, the edge of the line electrodes 106*a* is sharp) in order to reduce the line resistance of the line electrodes 106*a*, a continuous film 50 to 500 nm thick can be optimally formed by applying organic polymer in the longitudinal direction of the line electrodes 106*a* as shown in FIG. 8B, whereby optimal blocking properties and/or optimal interfacial crystallization suppressing properties can be obtained. Further, by repeatedly applying the blocking layer material, it is possible to form the blocking layer 107 in a thickness of 5 μm.

As in the third embodiment, by providing the blocking layer 107 with cushioning function, thermal stress due to difference in thermal expansion between the reading photoconductive layer 104 and the support 108 can be relieved, whereby failure due to the difference in thermal expansion coefficient, e.g., breakage of the reading photoconductive layer 104 and/or the support 108, can be avoided.

Figure 8C:
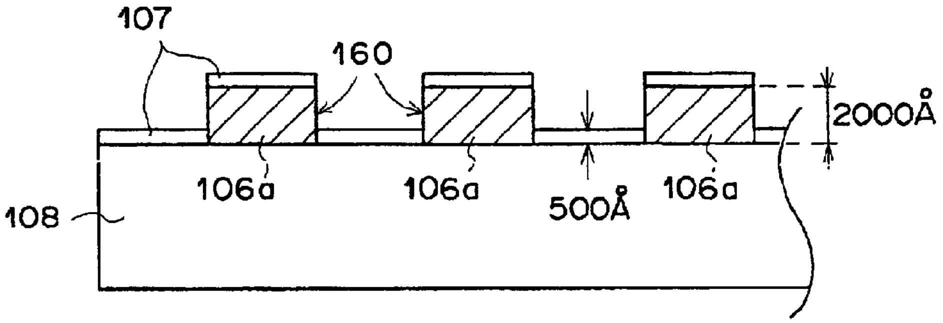
FIG. 8C is a view for illustrating the drawback involved when manufacturing the same in a different method.

To the contrast, when a $CeO_2$ blocking layer 107 is formed in a thickness of about 500 Å over ITO line electrodes 106*a* about 2000 Å thick by resistance heating vacuum deposition, the $CeO_2$ blocking layer 107 cannot cover the side surfaces 160 of the line electrodes 106*a* as shown in FIG. 8C due to sharp and high edges of the line electrodes 106*a*. Accordingly, a dark current is injected through the side surfaces 160 of the line electrodes 106*a* and the S/N ratio deteriorates. This problem becomes more serious as the thickness of the line electrodes 106*a* increases.

Figure 9A:
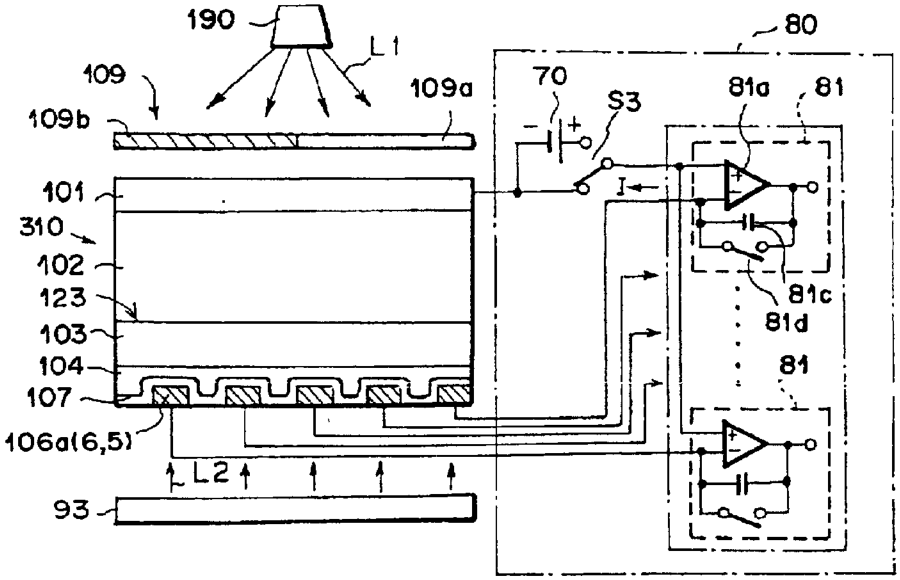
FIG. 9A is a schematic view showing an electrostatic latent image recording apparatus using the image recording medium of the fourth embodiment together with an electrostatic latent image reading apparatus.
Figure 9B:
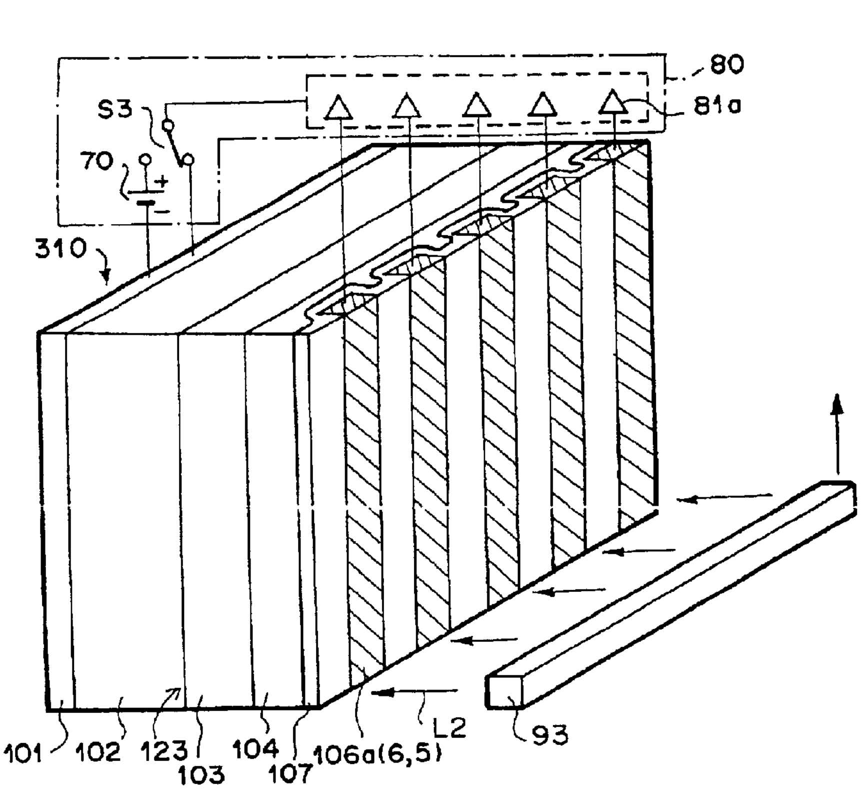
FIG. 9B is an enlarged perspective view showing a part of the recording/reading apparatus shown in FIG. 9A, FIGS. 10A to 10C are views for illustrating recording of a latent image on the image recording medium of the fourth embodiment.

A method of recording an image as a latent image on the image recording medium 310 of the first embodiment and a method of reading out the latent image from the image recording medium 310 will be briefly described, hereinbelow. FIGS. 9A and 9B show an electrostatic latent image recording apparatus using the image recording medium 310 together with an electrostatic latent image reading apparatus using the image recording medium 310. In this specification the electrostatic latent image recording apparatus together with the electrostatic latent image reading apparatus will be referred to as the recording/reading apparatus. In FIGS. 9A and 9B, the support 108 is abbreviated.

The recording/reading apparatus shown in FIGS. 9A and 9B is substantially the same as that shown in FIG. 2, and accordingly, in FIGS. 9A and 9B, the elements analogous to those shown in FIG. 2 are given the same reference numerals and will not be described in detail here. Mainly the difference from that shown in FIG. 2 will be described, hereinbelow.

The recording/reading apparatus shown in FIGS. 9A and 9B mainly differs from that shown in FIG. 2 in that a detecting amplifier 81 is provided for each of the line electrodes 106*a* of the image recording medium 310 and a line beam extending in the transverse direction of the line electrodes 106*a* is used as the reading light and is caused to scan the electrodes 106*a* in the longitudinal direction of the electrodes 106*a*.

A reading light scanning means 93 emits a line beam extends in a direction substantially perpendicular to the line electrodes 106*a* and causes the line beam to scan the electrodes 106*a* in their longitudinal direction. When the reading light electrode layer 105 is provided with such line electrodes 106*a* and the reading light is in the form such a line beam, it becomes not necessary to scan the reading light side electrode layer 105 with a beam spot and accordingly, the scanning optical system can be simplified and less expensive. Further since an incoherent light source can be used, generation of interference fringe noise can be suppressed.

The electric current detecting circuit 80 comprises a plurality of detecting amplifiers 81 each connected to one of the line electrodes 106*a* of the image recording medium 310. The recording light side electrode layer 101 of the image recording medium 310 is connected to one of the fixed contacts of a third switching means S3 and the negative pole of the power source 70. The positive pole of the power source 70 is connected to the other fixed contact of the third switching means S3. The movable contact of the third switching means S3 is connected to the non-inversion input terminal (+) of an operational amplifier 81*a*. Each line electrode 106*a* is connected to an inversion input terminal (−) of the corresponding operational amplifier 81*a*. The detecting amplifier 81 is of a charge amplifier arrangement and comprises the operational amplifier 81*a*, an integrating capacitor 81*c* and a switch 81*d*.

Figure 10A:
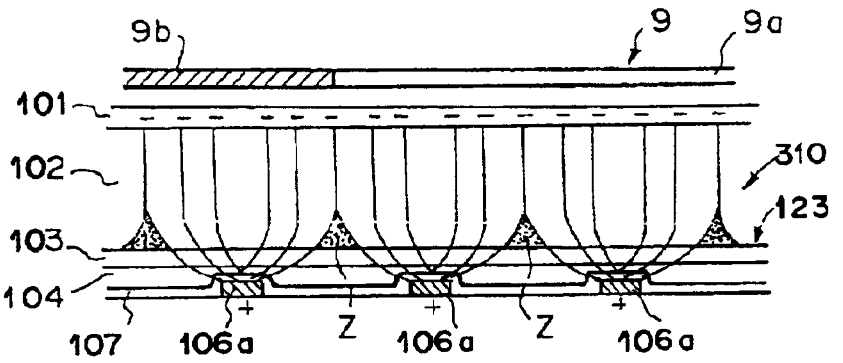

Recording of a latent image on the image recording medium 310 will be described with reference to FIGS. 10A to 10C, hereinbelow.

Recording on the image recording medium 310 is basically the same as recording on the image recording medium 10 of the first embodiment except accumulation of the charge in the charge accumulating portion. First a direct voltage is applied between the recording light side electrode layer 101 and the line electrodes 106*a*, whereby the recording light side electrode layer 101 and the line electrodes 106*a* are electrified at the respective polarities. Thus, a U-shaped electric field is formed between each line electrodes 106*a* of the reading light side electrode layer 105 and the recording light side electrode 101 as shown in FIG. 10A. As can be seen from FIG. 10A, though a substantially parallel electric field exists in the majority of the recording photoconductive layer 102, there are portions (indicated at Z) where no electric field exists in the surface area of the recording photoconductive layer 102 facing the charge transfer layer 103. As the sum of the thickness of the charge transfer layer 103 and the reading photoconductive layer 104 is smaller as compared with the thickness of the recording photoconductive layer 102 or the intervals of the line electrodes 106*a*, such electric field-less portions are formed more clearly.

Figure 10B:
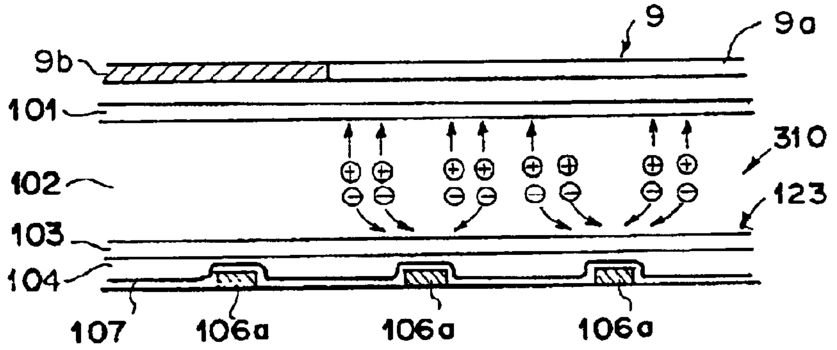
Figure 10C:
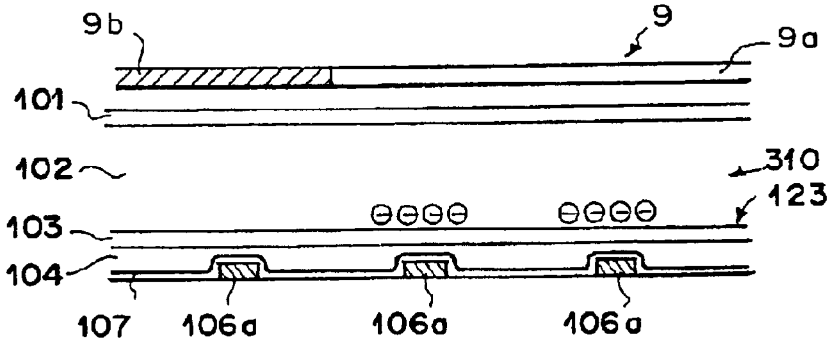

When the recording light L1 is projected onto the object 9 in this state, the negative charge out of the positive and negative charges generated by the permeable part of the object 9 is accumulated on the line electrodes 106*a* along the electric field distribution as shown in FIG. 10B and a latent image is formed about the line electrodes 106*a* as shown in FIG. 10C. When the amount of recording light L1 impinging upon the recording photoconductive layer 102 is small, the charges accumulated on the respective line electrodes 106*a* are separated from each other. Since the chares are accumulated on the respective line electrodes 106*a*, sharpness (spatial resolution) of the latent image can be increased by narrowing the pitches of the line electrodes 106*a* (pixel pitches). Further since the electric fields are concentrated to the line electrodes, the reading efficiency is improved and the S/N ratio is increased. Recently, forming the line electrodes 106*a* in sufficiently small intervals is easy.

When reading out the electrostatic latent image thus formed, the movable contact of the third switching means S3 is connected to the recording light side electrode layer 101 and the electric charges are rearranged by equalizing the potentials of the electrode layers 101 and 105 through imaginary short-circuiting of the operational amplifiers 81*a*. When the reading light scanning means 93 subsequently causes the line reading beam L2 to scan the line electrodes 106*a* in their longitudinal direction, the parts of the reading photoconductive layer 104 become conductive and electric currents flow in the reading photoconductive layer 104. The electric currents charge the integrating capacitors 81*a* of the operational amplifiers 81 and the charge is accumulated in each capacitor 81*a* according to the amount of the corresponding electric current. That is, the voltage across the capacitor 81*a* increases according to the amount of the corresponding electric current. Accordingly, when the switch 81*d* of each detecting amplifier 81 is repeatedly closed and opened, the voltage across the capacitor 81*a* changes according to the accumulated charge for each pixel. Accordingly, by reading the change in voltage across each capacitor 81*a*, the latent image recorded on the image recording medium 310 can be read out.

When the electrostatic latent image is read out in this way, image signal components for a plurality of pixels can be obtained at one time, whereby reading time is shortened. Further, since the reading light side electrode layer 105 is in the form of a stripe electrode, capacity distribution in the charge transfer layer 103 and the reading photoconductive layer 104 is small and accordingly, the detecting amplifier 81 is less apt to be affected by noise. Further, image signal components for the pixels can be corrected on the basis of the pitches of the line electrodes 106*a* and accordingly, the structure noise can be accurately corrected.

Further, since the line electrodes 106*a* attracts the charge of the latent image polarity, the charge of the transfer polarity generated upon exposure to the reading light L2 can easily cancel the charge of the latent image polarity, whereby the sharpness of the image can be held high also for reading. This effect is especially high when the amount of the recording light is small. When the inter-electrode spaces are impermeable to the reading light L2, the sharpness can be further enhanced.

Further, since the electric field strength of the reading photoconductive layer 104 increases near the line electrodes 106*a* and charged pairs are generated by the reading light L2 in the strong electric field, the ion dissociation efficiency is increased and the quantum efficiency in generation of the charged pairs can be approximated to 1, whereby the reading efficiency and the S/N ratio can be increased and light density can be reduced. Further, since the capacities of the charge transfer layer 103 and the reading photoconductive layer 104 are small, the signal fetch efficiency upon reading is increased.

When the spaces between the line electrodes 106*a* (the inter-electrode spaces) are impermeable to the reading light L2 and impermeable portions and permeable portions are alternately provided at predetermined intervals in the longitudinal direction of the line electrodes 106*a*, portions permeable to the reading light L2 are clearly separated from each other in both the transverse and longitudinal directions, whereby deterioration in spatial resolution due leakage of the reading light L2 between adjacent permeable portions can be prevented and a very sharp image can be obtained without highly converging the reading light L2 as if the reading light side electrode layer is scanned by a plurality of small light spots.

Figures 11A, 11B:
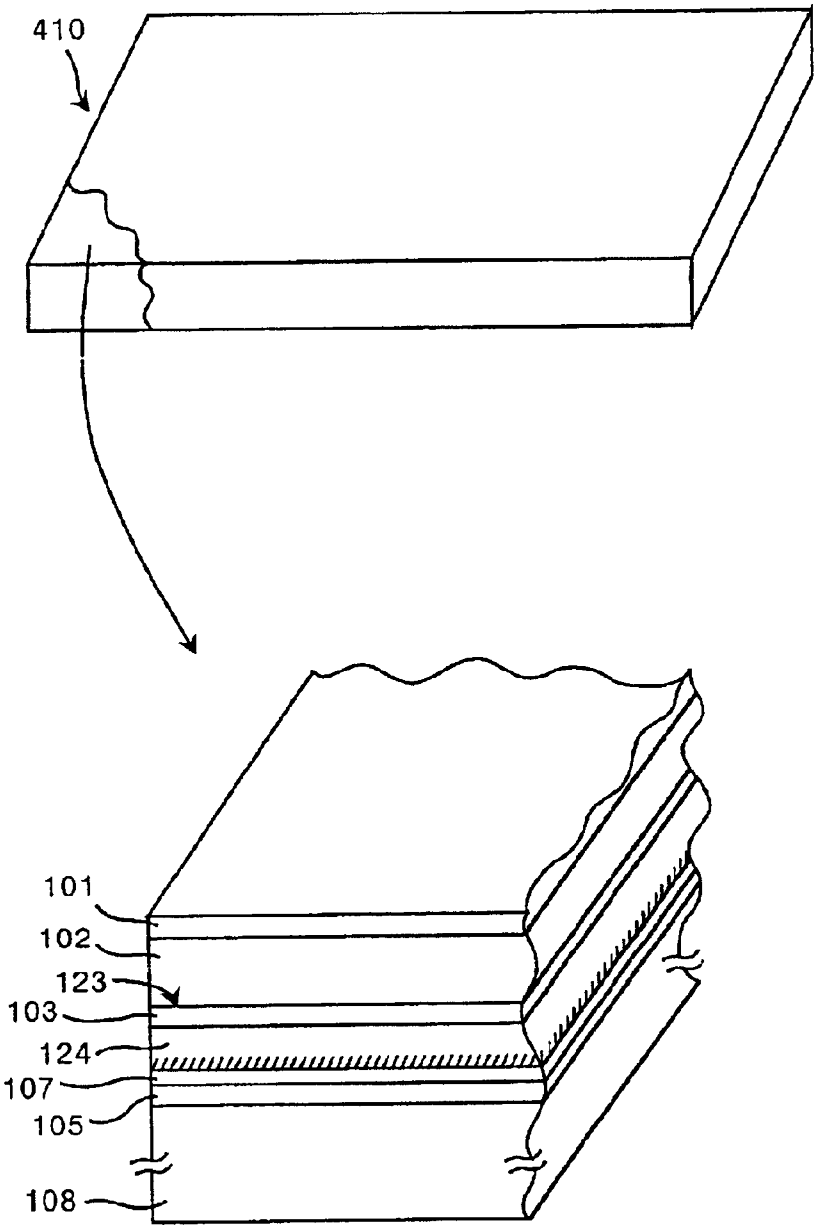
FIG. 11A is a perspective view of an image recording medium in accordance with a fifth embodiment of the present invention.
FIG. 11B is a cross-sectional view of a part of the image recording medium shown in FIG. 11A, FIGS. 12A to 12D are views for illustrating recording a latent image on the image recording medium of the fifth embodiment and reading the latent image therefrom.

An image recording medium 410 in accordance with a fifth embodiment of the present invention will be described with reference to FIGS. 11A and 11B, hereinbelow. The elements analogous to those in the third embodiment are given the same reference numerals in FIGS. 11A and 11B and will not de described in detail here.

The image recording medium 410 in accordance with the fifth embodiment of the present invention comprises a support 108, and a reading light side electrode layer 105, a blocking layer 107, a reading photoconductive layer 124, a charge transfer layer 103, the recording photoconductive layer 102 and a recording light side electrode layer 101 which are superposed on the support 108 one on another in this order. The reading photoconductive layer 124 is doped in the surface area facing the blocking layer 107 with an interfacial crystallization suppressing material which suppresses interfacial crystallization of a-Se and a material which increases traps for a charge of the polarity opposite to that at which the recording light side electrode layer 101 is electrified and reduces traps for the charge of the same polarity as the polarity at which the recording light side electrode layer 101 is electrified.

The blocking layer 107 in this embodiment suppresses interfacial crystallization of a-Se and has a function of blocking the electric charge on the reading light side electrode layer 105 from being injected into the reading photoconductive layer 124. That the blocking layer 104 has a function of blocking the electric charge at which the reading light side electrode layer 105 is electrified from being injected into the reading photoconductive layer 124 means that the layer prevents the electric charge from moving to a space-charge layer formed on the interface between the reading photoconductive layer 124 and a blocking layer 107, thereby stabilizing the space-charge layer.

As described above, the reading photoconductive layer 124 is doped in the surface area facing the blocking layer 107 with an interfacial crystallization suppressing material which suppresses interfacial crystallization of a-Se and a material which increases traps for a charge of the polarity opposite to that at which the recording light side electrode layer 101 is electrified and reduces traps for the charge of the same polarity as the polarity at which the recording light side electrode layer 101 is electrified. As the interfacial crystallization suppressing material, As is employed as in the second embodiment. However the preferred doping amount of As is different from that in the second embodiment and is 3 to 40 atom %. When the reading light side electrode layer 105 is positively electrified, the material which increases traps for a charge of the polarity opposite to that at which the reading light side electrode layer 105 is electrified and reduces traps for the charge of the same polarity as the polarity at which the reading light side electrode layer 105 is electrified is preferably Cl and the doping amount of Cl is preferably 1 to 1000 ppm.

Whereas when the reading light side electrode layer 105 is negatively electrified, the material which increases traps for a charge of the polarity opposite to that at which the reading light side electrode layer 105 is electrified and reduces traps for the charge of the same polarity as the polarity at which the reading light side electrode layer 105 is electrified is preferably Na and the doping amount of Na is preferably 1 to 1000 ppm. When the reading light side electrode layer 105 is positively charged, Cl releases positive holes and traps electrons whereas when the reading light side electrode layer 105 is negatively charged, Na releases electrons and traps positive holes. As a result, a negative or positive space-charge layer is formed in the surface area facing the blocking layer 107.

A method of recording an image as a latent image on the image recording medium 410 and a method of reading out the latent image from the image recording medium 410 will be briefly described with reference to FIGS. 12A to 12D, hereinbelow. The recording/reading apparatus used is the same as that shown in FIG. 2. In FIGS. 12A to 12D, the support 108 is abbreviated.

Figure 12A:
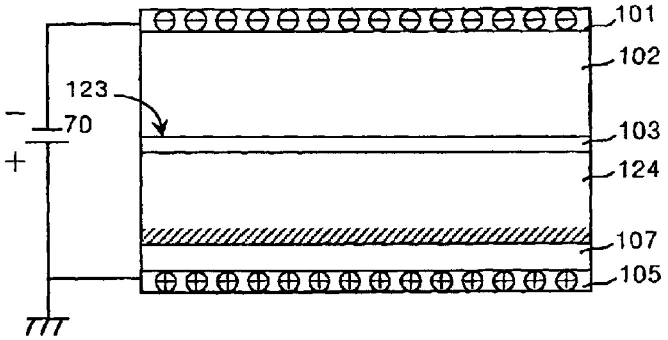
Figure 12B:
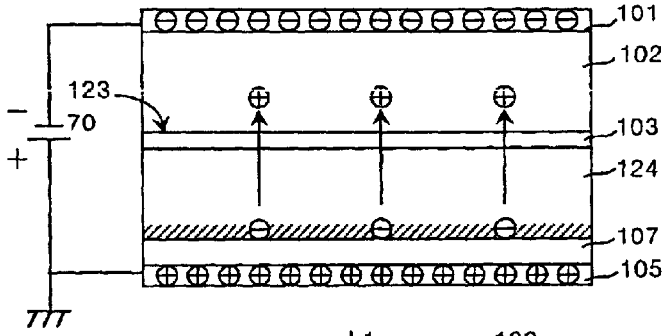

When a direct voltage Ed is applied between the recording light side electrode layer 101 and the reading light side electrode layer 105 from the power source 70, the recording light side electrode layer 101 is negatively charged and the reading light side electrode layer 105 is positively charged as shown in FIG. 12A, whereby a parallel electric field is established between the recording light side electrode layer 101 and the reading light side electrode layer 105 in the image recording medium 410.

Immediately thereafter, Cl in the surface area of the reading photoconductive layer 124 facing the blocking layer 107 releases positive holes and a negative space-charge layer is formed. (FIG. 12B) Since the blocking layer 107 prevents the charge from moving into the negative space-charge layer from the reading light side electrode layer 106, the negative space-charge layer is stabilized.

Figure 12C:
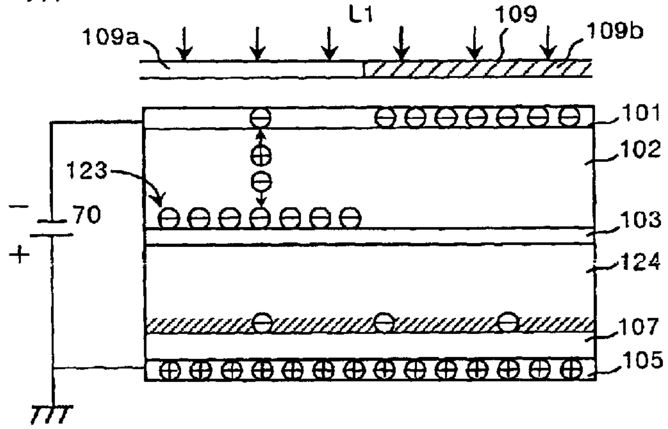
Figure 12D:
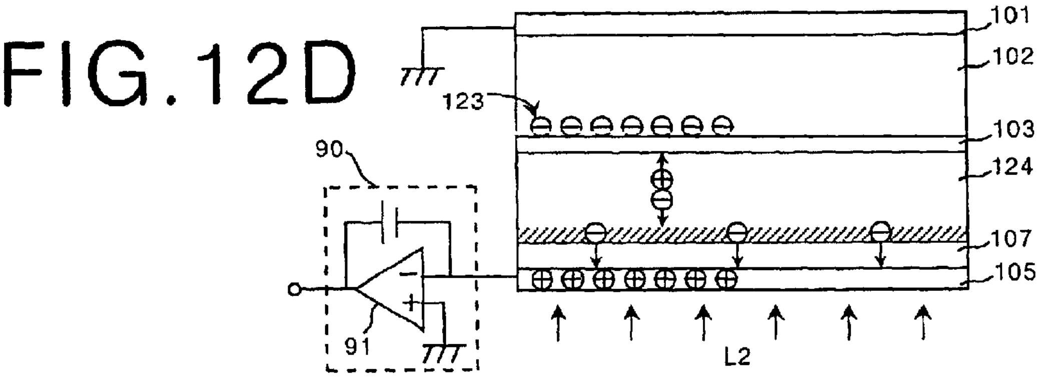

Thereafter the object 9 is uniformly exposed to the recording light L1 from the recording light projecting means 90. The part of the recording light L1 passing through the permeable part 9*a* of the object 9 impinges upon the recording photoconductive layer 102 through the recording light side electrode layer 101. The part of the recording photoconductive layer 102 exposed to the recording light L1 generates pairs of electron and positive hole according to the amount of the recording light L1 to which the part is exposed and becomes conductive. (FIG. 12C)

The positive charge generated in the recording photoconductive layer 102 moves toward the recording light side electrode layer 101 at high speed and encounters the negative charge of the recording light side electrode layer 101 at the interface of the recording photoconductive layer 102 and the recording light side electrode layer 101 to cancel each other by recombination. The negative charge generated in the radio-conductive layer 102 moves toward the charge transfer layer 103. Since the charge transfer layer 103 behaves as a substantially insulating material to the electric charge of the latent image polarity (negative in this particular embodiment), the negative charge is stopped at the charge accumulating portion 123 formed on the interface of the recording photoconductive layer 102 and the charge transfer layer 103 and is accumulated in the charge accumulating portion 123. To the contrast, the part of the recording photoconductive layer 102 behind the impermeable part 9*b* of the object 9 is kept unchanged since the part is not exposed to the recording light L1. (FIG. 12C)

Figure 13:
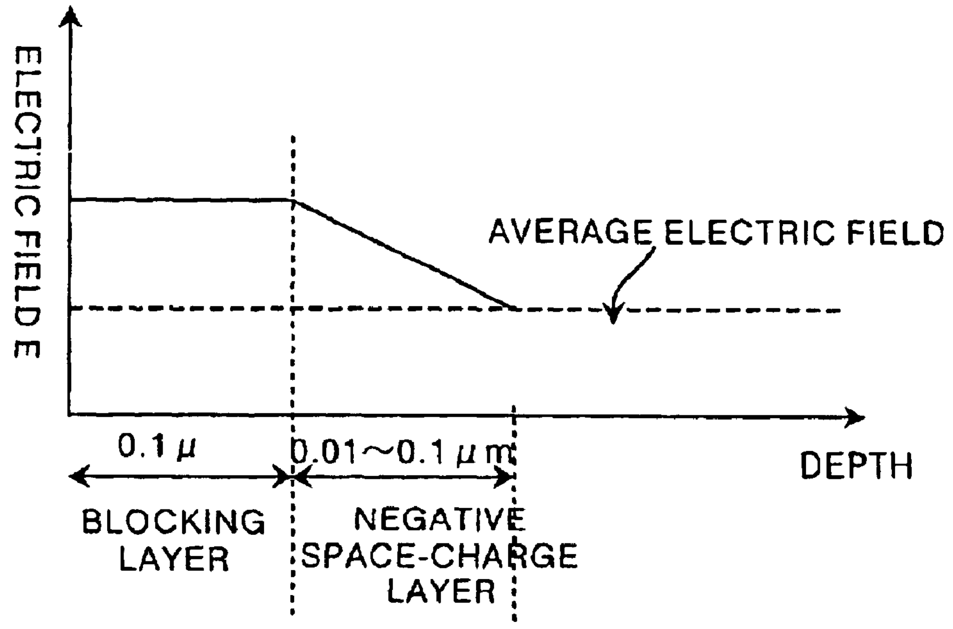
FIG. 13 is a view showing the relation between the distance from the incident surface of the reading light and the strength of the electric field.

An electric field is formed between the charge accumulating portion 123 in which the charge of the latent image polarity is accumulated and the reading light side electrode layer 105 according to the sum of thickness of the reading photoconductive layer 104 and the charge transfer layer 103 and the amount of the charge of the latent image polarity. Further an electric filed is formed between the negative space-charge layer and the reading light side electrode layer 105, and the electric field is locally enhanced in the negative space-charge layer. FIG. 13 shows the relation between the depth (the distance from the incident surface of the reading light) and the strength of the electric field. As shown by the solid line in FIG. 13, the strength of the electric field is increased toward the incident surface of the reading light in the negative space-charge layer since negative charge is uniformly distributed in a predetermined density in the negative space-charge layer. When the negative space-charge layer is not formed, a uniform average electric field is formed by the latent image polarity charge accumulated in the charge accumulating portion 123 and the positive charge on the reading light side electrode layer 105 as shown by the dashed line in FIG. 13.

Then the recording light side electrode layer 101 is grounded and the reading light side electrode layer 105 is connected to the detecting amplifier 91 of the current detecting circuit 90. Then, when the reading light projecting means 92 causes the reading light L2 to scan the reading light side electrode layer 105, the reading light L2 impinges upon the reading photoconductive layer 124 through the reading light side electrode layer 105. The part of the photoconductive layer 124 exposed to the reading light L2 generates positive and negative charged pairs and becomes conductive.

Since the charge transfer layer 3 is conductive to the charge of the transfer polarity (the positive charge in this particular embodiment), the positive charge generated in the reading photoconductive layer 124 moves toward the charge accumulating portion 23 at high speed attracted by the negative charge therein and encounters the negative charge to cancel each other by recombination. At this time, since the electric filed is strengthened in the negative space-charge layer between the reading photoconductive layer 124 and the blocking layer 107, charged pair generating efficiency upon exposure to the reading light is increased. Accordingly, even if the amount of electrons accumulated in the charge accumulating portion 123 is small and the electric field is weak (the amount of the recording light is small), a sufficient charged pair generating efficiency can be obtained without increasing the intensity of the reading light. In order to effectively obtain the effect, it is preferred that the depth of the negative space-charge layer, that is, the thickness of the doped region be not larger than the depth of reading light absorption of the reading photoconductive layer 124.

The change in flow of the electric current in response to vanishment of the latent image polarity charge is detected by the current detecting circuit 80. Though the negative space-charge layer can be also formed in the part of the reading photoconductive layer opposed to the part of the recording photoconductive layer which is not exposed to the recording light and charged pairs can be generated upon exposure to the reading light, no current is detected since no electric field is formed between the charge accumulating portion 123 and the reading light side electrode layer 105.

Though, in the embodiments described above, the recording side electrode layer 101 and the reading light side electrode layer 105 are negatively and positively electrified respectively, they may be electrified in reverse polarities. In such a case, an electron transfer layer is employed as the charge transfer layer. In the case of the fifth embodiment, the reading photoconductive layer is doped with Na in place of Cl.

As the material of the recording photoconductive layer, lead oxide (II), lead iodide (II) or the like may be employed. Further, the charge transfer layer may be suitably formed of N-trinitrofluorenidene-aniline (TFNA) derivative, trinitrofluorenone (TNF)/polyester dispersed system, asymmetric diphenoquinone derivative or the like.

The charge accumulating layer may be of a trap layer which traps the charge of the latent image polarity.

The method of suppressing interfacial crystallization by doping the reading photoconductive layer of a-Se with As or by providing a blocking layer between the reading photoconductive layer and the reading light side electrode layer, can be applied to suppress interfacial crystallization at the interface between the recording light side electrode layer and the recording photoconductive layer. Further, when a radiation passing through an object is once converted to visible light by a phosphor layer and the visible light is projected onto the image recording medium, the recording light side electrode layer must be permeable to visible light. In such a case, a transparent oxide film must be used as the electrode layer, and accordingly, the present invention is useful.

What is claimed is:

1. An image recording medium comprising a support permeable to a reading electromagnetic wave and a first electrode layer permeable to the reading electromagnetic wave, a reading photoconductive layer which is formed of a material containing a-Se as a major component and exhibits conductivity upon exposure to the reading electromagnetic wave, a charge accumulating portion which accumulates an electric charge of a latent image polarity generated in a recording photoconductive layer, the recording photoconductive layer which exhibits conductivity upon exposure to a recording electromagnetic wave and a second electrode layer permeable to the recording electromagnetic wave which are superposed on the support one on another in this order, wherein the reading photoconductive layer is doped over the whole or in the surface area facing the first electrode layer with an interfacial crystallization suppressing material which suppresses interfacial crystallization of a-Se, and wherein the thickness of a region doped with both the interfacial crystallization suppressing material and a material which increases traps for a charge of the polarity opposite to that at which the first electrode layer is electrified and reduces traps for the charge of the same polarity as the polarity at which the first electrode layer is electrified is 0.01 to 0.1 μm.

2. An image recording medium as defined in claim 1 in which said interfacial crystallization suppressing material is As.

3. An image recording medium as defined in claim 2 in which As is doped in an amount of 0.5 to 40 atom %.

4. An image recording medium as defined in claim 3 in which the reading photoconductive layer is 0.05 to 0.5 μm in thickness.

5. An image recording medium as defined in claim 2 in which Cl is doped in an amount of 1 to 1000 ppm in addition to As.

6. An image recording medium as defined in claim 2 in which Na is doped in an amount of 1 to 1000 ppm in addition to As.

7. An image recording medium as defined in claim 1 in which the interfacial crystallization suppressing material in the surface area forms a transparent interfacial crystallization suppressing layer which is 0.05 to 5 μm in thickness.

8. An image recording medium as defined in claim 7 in which the transparent interfacial crystallization suppressing layer is 0.1 to 0.5 μm in thickness.

9. An image recording medium as defined in claim 1 in which the electrode of the first electrode layer is of ITO.

10. An image recording medium comprising a support permeable to a reading electromagnetic wave and a first electrode layer permeable to the reading electromagnetic wave, a reading photoconductive layer which is formed of a material containing a-Se as a major component and exhibits conductivity upon exposure to the reading electromagnetic wave, a charge accumulating portion which accumulates an electric charge of a latent image polarity generated in a recording photoconductive layer, the recording photoconductive layer which exhibits conductivity upon exposure to a recording electromagnetic wave and a second electrode layer permeable to the recording electromagnetic wave which are superposed on the support one on another in this order, wherein an interfacial crystallization suppressing layer which is permeable to the reading electromagnetic wave, suppresses interfacial crystallization of a-Se, and has a function of blocking the electric charge at which the first conductive layer is electrified from being injected into the reading photoconductive layer is provided between the first electrode layer and the reading photoconductive layer, and the reading photoconductive layer is doped over the whole or in the surface area facing the interfacial crystallization suppressing layer with an interfacial crystallization suppressing material which suppresses interfacial crystallization of a-Se and a material which increases traps for a charge of the polarity opposite to that at which the first electrode layer is electrified and reduces traps for the charge of the same polarity as the polarity at which the first electrode layer is electrified.

11. An image recording medium as defined in claim 10 in which said interfacial crystallization suppressing material is As.

12. An image recording medium as defined in claim 11 in which As is doped in an amount of 3 to 40 atom %.

13. An image recording medium as defined in claim 10 in which the first electrode layer is positively electrified, and the material which increases traps for a charge of the polarity opposite to that at which the first electrode layer is electrified and reduces traps for the charge of the same polarity as the polarity at which the first electrode layer is electrified is Cl.

14. An image recording medium as defined in claim 13 in which the doping amount of Cl is 1 to 1000 ppm.

15. An image recording medium as defined in claim 10 in which the first electrode layer is negatively electrified, and the material which increases traps for a charge of the polarity opposite to that at which the first electrode layer is electrified and reduces traps for the charge of the same polarity as the polarity at which the first electrode layer is electrified is Na.

16. An image recording medium as defined in claim 15 in which the doping amount of Na is 1 to 1000 ppm.

17. An image recording medium as defined in claim 10 in which the thickness of the region doped with both the interfacial crystallization suppressing material and the material which increases traps for a charge of the polarity opposite to that at which the first electrode layer is electrified and reduces traps for the charge of the same polarity as the polarity at which the first electrode layer is electrified is 0.01 to 0.1 μm.

18. An image recording medium as defined in claim 10 in which the reading electromagnetic wave is 350 to 550 nm in wavelength.

19. An image recording medium as defined in claim 10 in which the interfacial crystallization suppressing layer is of an organic film.

20. An image recording medium as defined in claim 19 in which the organic film is of an organic polymer.

21. An image recording medium as defined in claim 19 in which the organic film is of a mixture of an organic binder and a low-molecular organic material.

22. An image recording medium as defined in claim 10 in which the interfacial crystallization suppressing layer is 0.05 to 5 μm in thickness.

23. An image recording medium as defined in claim 22 in which the interfacial crystallization suppressing layer is 0.1 to 0.5 μm in thickness.

24. An image recording medium as defined in claim 10 in which the electrode of the first electrode layer is a stripe electrode comprising a plurality of line electrodes and said interfacial crystallization suppressing layer is provided continuously along the upper surface and the longitudinal side surfaces of each of the line electrodes.

25. An image recording medium as defined in claim 24 in which the electrode of the first electrode layer is of ITO.

26. A method of manufacturing an image recording medium as defined in claim 24 characterized in that material of said interfacial crystallization suppressing layer is applied in the longitudinal direction of the line electrodes.

* * * * *